United States Patent
Devarakonda et al.

(10) Patent No.: US 12,401,075 B2
(45) Date of Patent: Aug. 26, 2025

(54) SYSTEM FOR FIRE PREVENTION IN BATTERY SYSTEMS

(71) Applicant: Analytical Scientific Products LLC, Dallas, TX (US)

(72) Inventors: Vijay Venkat Devarakonda, Dallas, TX (US); Nikhil Devarakonda, Dallas, TX (US)

(73) Assignee: Analytical Scientific Products LLC, Dallas, TX (US)

( * ) Notice: Subject to any disclaimer, the term of this patent is extended or adjusted under 35 U.S.C. 154(b) by 638 days.

(21) Appl. No.: 17/752,435

(22) Filed: May 24, 2022

(65) Prior Publication Data
US 2022/0407145 A1 Dec. 22, 2022

Related U.S. Application Data

(60) Provisional application No. 63/212,351, filed on Jun. 18, 2021.

(51) Int. Cl.
*H01M 10/6556* (2014.01)
*H01M 10/0525* (2010.01)
(Continued)

(52) U.S. Cl.
CPC ..... *H01M 10/6556* (2015.04); *H01M 10/613* (2015.04); *H01M 10/615* (2015.04);
(Continued)

(58) Field of Classification Search
CPC ......... H01M 10/6555; H01M 10/6557; H01M 10/6568; H01M 50/204; H01M 50/213;
(Continued)

(56) References Cited

U.S. PATENT DOCUMENTS 7,433,794 B1 10/2008 Berdichevsky et al.
9,379,419 B2 6/2016 Krolak
(Continued)

FOREIGN PATENT DOCUMENTS

DE 102013014903 A1 * 3/2015 .......... H01M 10/613
JP 2000251951 A * 9/2000 .......... H01M 10/613
(Continued)

OTHER PUBLICATIONS

Machine Translation Relied Upon for WO-2014023485-A1. (Year: 2012).*

*Primary Examiner* — Marla D McConnell
*Assistant Examiner* — Olivia A Jones
(74) *Attorney, Agent, or Firm* — Frost Brown Todd LLP

(57) ABSTRACT

Systems and methods are described for thermal management, detection of abnormal cell heating, prevention of thermal runaway in the failing battery as well as the prevention of thermal runaway propagation and fire spread in battery systems. Battery systems and modules under the present disclosure can comprise deformation elements that deform when heated by a battery experiencing some type of failure. The deformation can be used to puncture a coolant tube, activate a nozzle, or otherwise release coolant onto the failing battery. The direct contact heat transfer, such as under boiling conditions, can quickly dissipate the heat using less coolant than prior art systems. Electrical circuits can automatically detect the deformation and disconnect the failing module or battery from a larger system.

15 Claims, 23 Drawing Sheets

(51) Int. Cl.
  *H01M 10/613* (2014.01)
  *H01M 10/615* (2014.01)
  *H01M 10/63* (2014.01)
  *H01M 10/6568* (2014.01)

(52) U.S. Cl.
  CPC ....... *H01M 10/63* (2015.04); *H01M 10/6568* (2015.04); *H01M 10/0525* (2013.01)

(58) Field of Classification Search
  CPC ....... H01M 2200/10; H01M 2200/101; H01M 10/61; H01M 10/65; H01M 10/6552
  See application file for complete search history.

(56) References Cited

U.S. PATENT DOCUMENTS

| | | |
|---|---|---|
| 9,490,507 B2 | 11/2016 | Bandauer et al. |
| 9,620,830 B2 | 4/2017 | Chan et al. |
| 10,991,923 B2 | 4/2021 | Cordani et al. |
| 11,949,083 B2 * | 4/2024 | Zhamu .............. H01M 10/6556 |
| 2010/0136391 A1 * | 6/2010 | Prilutsky ........... H01M 10/6566 |
| | | 429/62 |
| 2012/0003517 A1 * | 1/2012 | Choi ................. H01M 50/3425 |
| | | 429/62 |
| 2015/0270588 A1 * | 9/2015 | Masias ................ H01M 10/625 |
| | | 429/50 |
| 2021/0010758 A1 | 1/2021 | Chopard et al. |
| 2021/0154503 A1 | 5/2021 | Ginder et al. |
| 2023/0238632 A1 * | 7/2023 | Kritzer ................ H01M 10/613 |
| | | 429/62 |

FOREIGN PATENT DOCUMENTS

| | | | | |
|---|---|---|---|---|
| WO | WO-9845887 A1 * | 10/1998 | .......... | H01M 2/1241 |
| WO | WO-2014023485 A1 * | 2/2014 | .......... | H01M 50/209 |

* cited by examiner

SYSTEM FOR FIRE PREVENTION IN BATTERY SYSTEMS

CROSS REFERENCE TO RELATED INFORMATION

This application claims the benefit of U.S. Provisional Patent Application No. 63/212,351, filed Jun. 18, 2021, titled, "Integrated System That Provides Thermal Management, Thermal Runaway Detection And Fire Prevention In Li Ion Batteries", the contents of which are hereby incorporated herein in its entirety.

TECHNICAL FIELD

The present disclosure is directed to fire prevention of electric batteries.

BACKGROUND

High energy density and consistent performance over several charge-discharge cycles have made the Li-ion batteries (LIBs) the preferred mode of energy storage and reuse. During operation, individual cells in the LIB pack heat up due to exothermic chemical reactions and internal electrical resistance. Currently, LIBs in high end applications are equipped with thermal management systems (TMS) to extract this heat provided it is produced slowly. Depending on the application, forced cooled air, heat pipes, phase change materials, and liquid heat exchangers are used to cool the batteries. Internal heat generation rate may increase as the batteries: age, are operated in harsh weather conditions or outside the intended design conditions (such as deep/rapid discharge), and experience failure and abuse. Current TMS cannot handle such conditions. Prolonged exposure to temperatures above 40° C. can degrade the battery performance, cause self-discharge, reduce the energy efficiency, and significantly shorten the cycle life. Also, the positive feedback between the chemical reactions and heat release can cause the cells to self-heat, reach thermal runaway, and catch fire. The potential for battery fires has forced the industry to add safety features in each cell, module, pack, and the system. These have proven to be inadequate as evidenced by the continued occurrence of battery fires in various applications. Currently there are no fire prevention technologies inside the battery packs. The rapid growth of energy dense batteries has created an urgent need for the development of reliable, low-cost, efficient, TMS and fire prevention strategies for LIBs.

BRIEF SUMMARY

One embodiment under the present disclosure comprises a battery module. The battery module comprises one or more batteries configured to provide power to one or more energy consuming components; and a deformation element coupled to at least one of the one or more batteries and configured to deform if the at least one battery reaches an unsafe temperature.

Another embodiment comprises another battery module embodiment. The battery module comprises one or more batteries configured to provide power; one or more coolant tubes configured to pass between the one or more batteries and to carry coolant; and one or more deformation elements coupled to the one or more batteries and configured to deform and open the one or more coolant tubes when the one or more batteries reaches an undesired temperature so as to direct coolant onto the one or more batteries experiencing the undesired temperature.

A further embodiment comprises a battery module. The battery module comprises two or more rows of one or more batteries, wherein the two or more rows are stacked vertically; and one or more coolant tubes, the one or more coolant tubes configured to comprise a path amongst the one or more batteries. It further comprises one or more deformation elements, each of the one or more deformation elements coupled to one of the one or more batteries and configured to deform if a failing battery amongst the one or more batteries reaches an unsafe temperature.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Embodiments under the present disclosure include multi-functional technologies that provide, at least, thermal management, detection of abnormal heating, detection of thermal runaway, thermal runaway propagation prevention, and fire spread prevention in batteries. One unique advantage of certain embodiments is the ability to accomplish these functions with a single system that serves both the low heat flux function needed for thermal management (namely cooling and heating of the battery pack under normal operating conditions when the cells may deviate slightly from the desired 10°-40° C. range) and high heat flux function needed for thermal runaway prevention (to quench individual cells undergoing excessive heating to prevent thermal runaway in the failing cell and its propagation to the other cells and fire).

Figure 1:
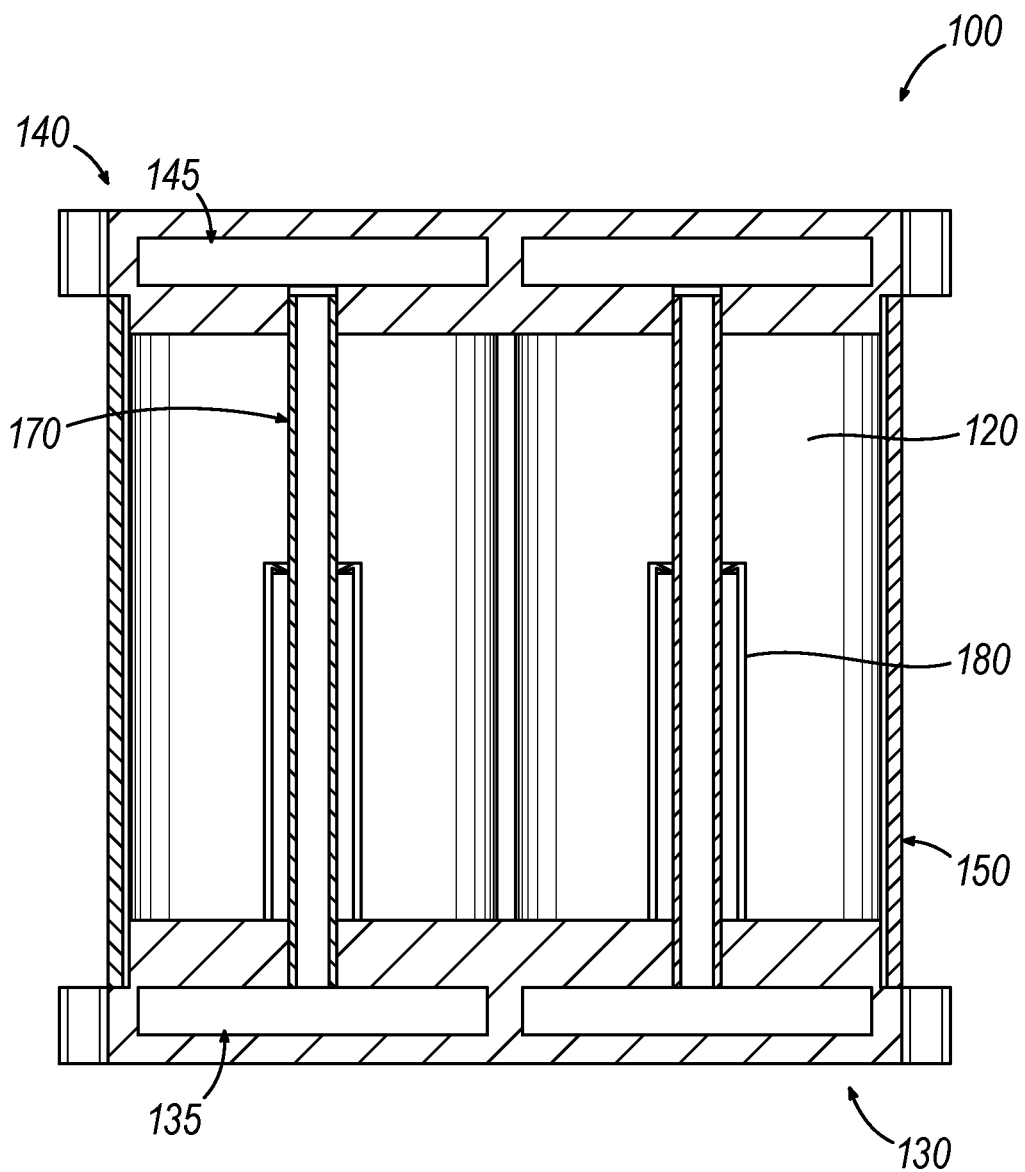
FIG. 1 shows a diagram of a battery module embodiment under the present disclosure.

One embodiment under the present disclosure is shown in FIG. 1. Battery unit 100 can comprise one or more batteries 120. Lithium-ion batteries are preferred but other primary and rechargeable battery types are possible. Batteries 120 can reside on top of a hollow bottom shell 130 and be topped by a top hollow shell 140. This particular unit 100 comprises four groupings, each of four batteries 120, for a total of 16 batteries. Walls 150 can bound the lateral edges of battery unit 100. Top conduit 145 and bottom conduit 135 comprise pathways for the flow of a fluid (e.g., a mixture of water and glycol). Top conduit 145 and bottom conduit 135 can be fluidly coupled to the conduits of other battery units. Tubes 170 are fluidly coupled to top conduit 145 and/or bottom conduit 135. Deformation elements (made from e.g., bi-metals or shape memory alloys) 180 are arranged along each battery 120. In this embodiment there is one tube 170 extending from the top shell 140 to the bottom shell for each group of four batteries 120 (for a total of four tubes 170 in the shown embodiment). Deformation elements 180 are placed along the edge of each battery 120 so as to face the respective tube 170. In this embodiment deformation strips 180 extend approximately halfway up each battery 120. In other embodiments the deformation element(s) 180 may extend less or more along the batteries 120, be taller or shorter, wider or thinner, or take a variety of shapes.

Figure 2:
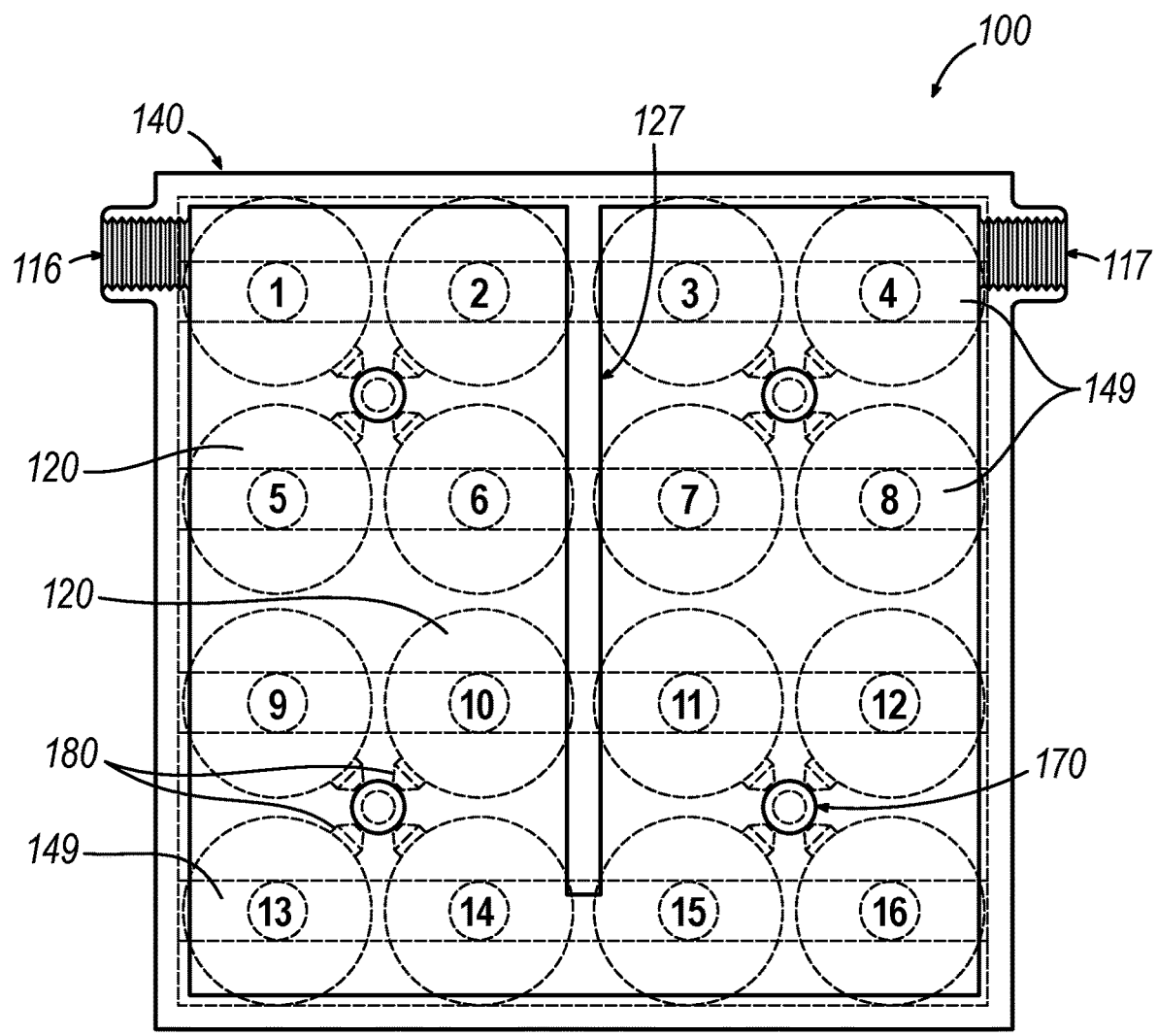
FIG. 2 shows a top view of a battery module embodiment under the present disclosure.

A top view of battery unit 100 is shown in FIG. 2. Inlet 116 and outlet 117 provide fluid coupling between top conduit 145 and a fluid supply or other battery units. Baffling 127 can restrain fluid within top shell 140 to improve mixing of the coolant flowing through the top conduit. Batteries 120 are arranged in groups of four, each group of four centered around a tube 170. Each battery 120 has a deformation element 180 on one face adjacent to the tube 170. Channels 149 are above each battery 120 and can provide space for battery terminals and wiring coupling batteries 120 and other battery modules 100 together. Channels 149 can extend from one side of battery module 100 to the other or can extend only a portion of the way (from both or either side). Channels 149 may run parallel to inlet 116 and outlet 117 or perpendicular or at an angle.

Figure 3:
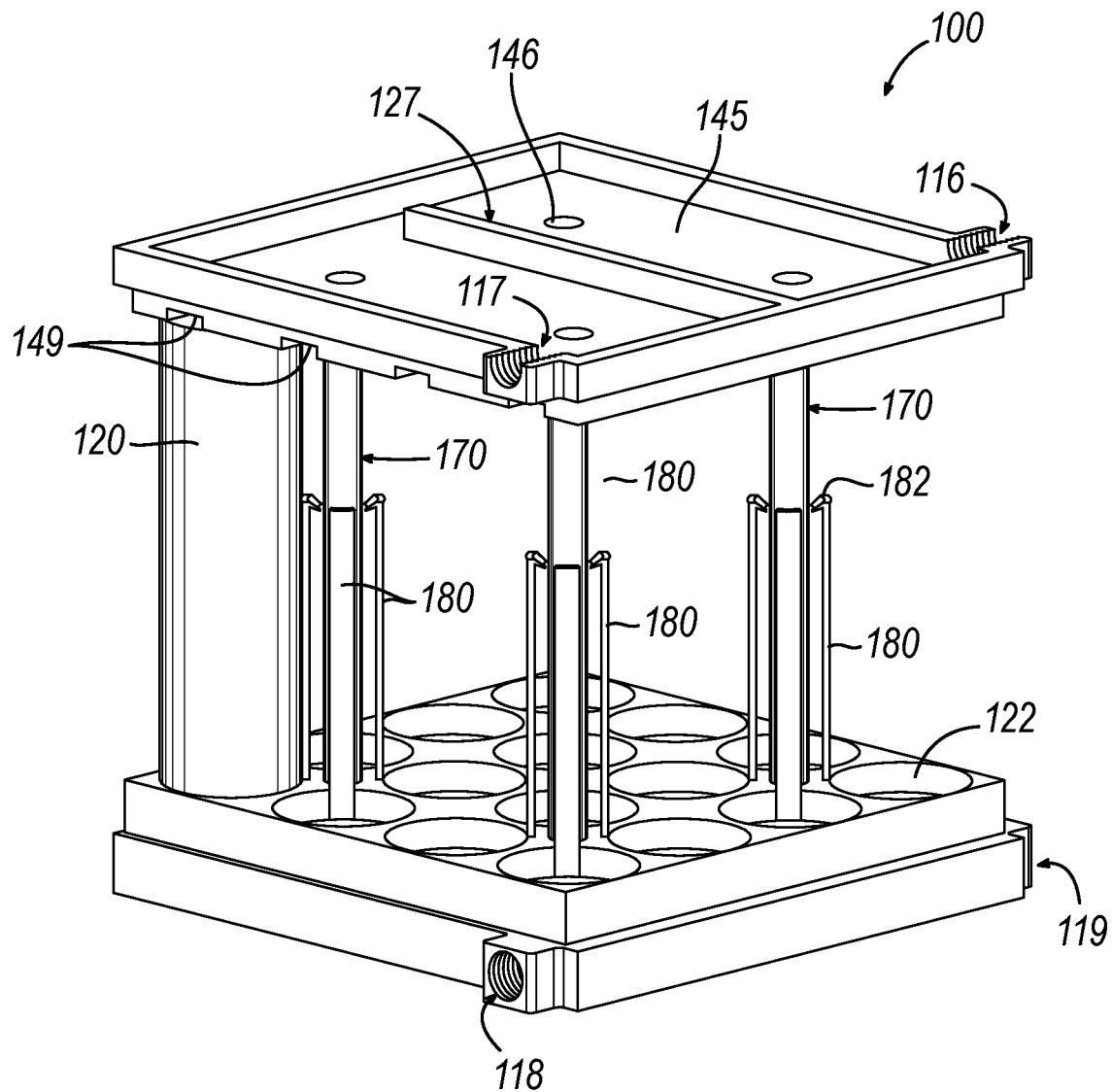
FIG. 3 shows a perspective view of a battery module embodiment under the present disclosure.

FIG. 3 shows a perspective cut-away view of battery unit 100. Some batteries 120 are removed for greater visibility of other components. Top conduit 145 connects inlet 116 and outlet 117 on the top shell 140. Channels 149 run across a bottom face of top shell 140 underneath the fluid conduit 145. The top cover of top shell 140 has been removed for illustration. Holes 146 connect tubes 170 to the top conduit 145 and bottom conduit 135. Inlet 118 and outlet 119 provide fluid coupling on the bottom shell 130 with other holes (not shown) connecting to tubes 170. Top and bottom shells 140, 130 can comprise indentations 122 to restrain and hold batteries 120. Deformation elements 180 can couple to an exterior surface of batteries 120. Deformation elements 180 can further comprise a point 182 (or sharp edge, pin, or other pointed extrusion). Channels 149 can allow the installation of batteries 120. For example, during a possible manufacturing process the top shell 140 and bottom shell 130 (with wiring and terminals) can be joined together with side walls (not shown here), except for one side with open access to channels 149. Batteries 149 can then be inserted and a final side wall installed. While in the described embodiment the channels 149 and terminals and wiring are located at the top of batteries 120, it could be possible to have battery module 100 embodiments with channels 149, terminals and wiring located at the bottom.

Deformation elements 180 can comprise a variety of materials. They preferably comprise a temperature sensitive component: any bimetal or shape memory alloy that is sensitive, deforms sufficiently when heated to e.g., >100° C., and can generate the pressure needed to puncture the liquid conduit, open a valve or act as one directly, or complete another action to discharge coolant. Possible shapes include a straight element attached to the cell, or a spiral element wound around the cell. Deformation elements 180 can comprise a bimetallic material. These materials typically comprise two or more materials that expand by different amounts as they are heated. This allows deformation elements 180 to convert thermal energy into lateral displacement and if the displacement is restricted, they impose pressure on the restraining surface. Commonly, heating causes bimetallic elements to bend in one direction, and cooling causes them to bend in an opposite direction. Shape memory alloys typically can be deformed when cold, and when heated return to their original shape or position. Incorporating a shape memory alloy into a deformation element under the present disclosure could entail using a shape memory alloy that is shaped at high temperatures to puncture or otherwise release coolant, but when cold the shape memory alloy is configured to lay flat on a battery or cell.

Figure 4:
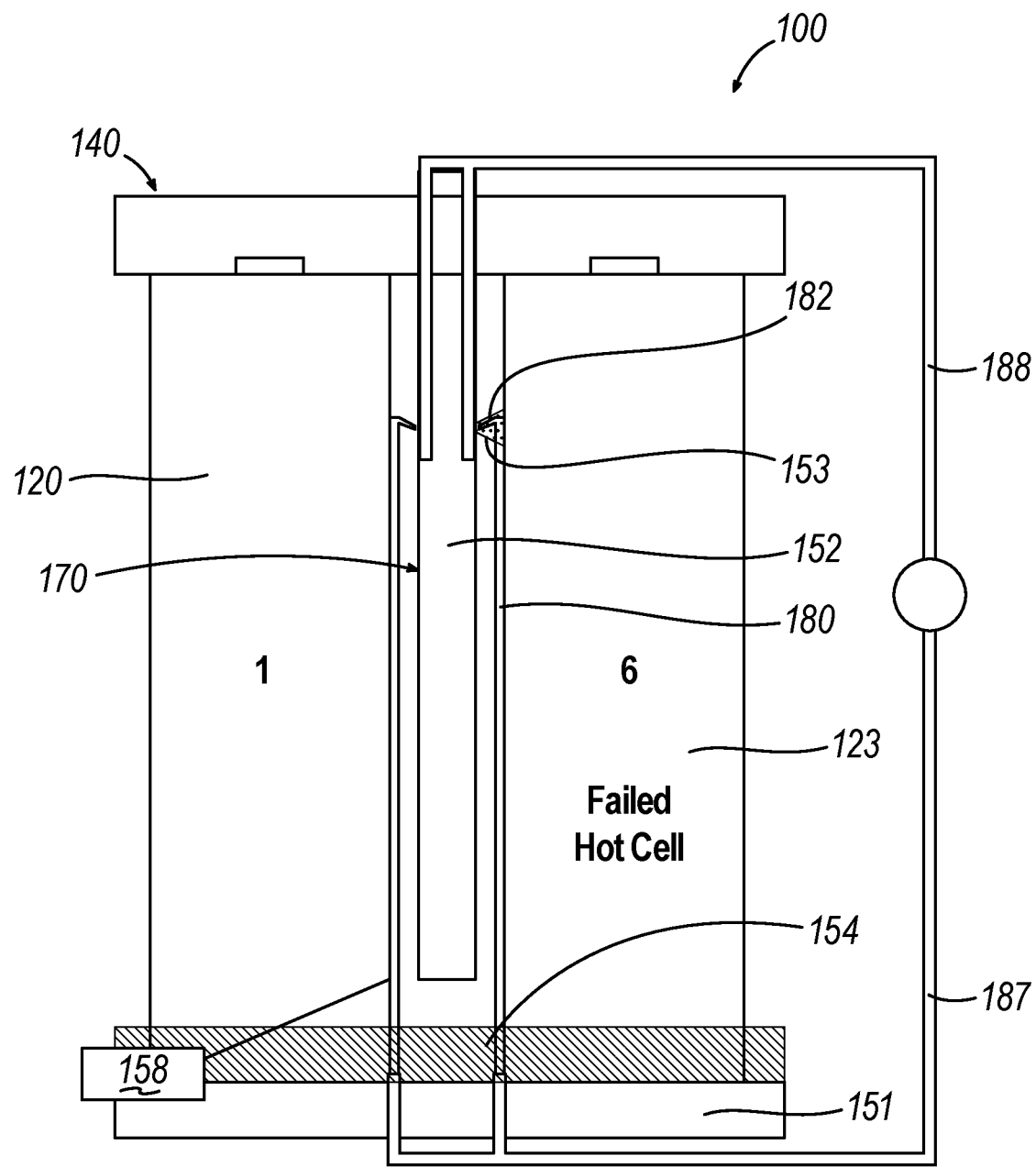
FIG. 4 shows a diagram of a battery module embodiment under the present disclosure.

Referring to FIG. 4, an embodiment is shown illustrating how thermal runaway can be prevented under the present disclosure. As one battery 123 experiences a failure and begins heating up, its deformation element 180 is heated and bends toward tube 170. Point 182 keeps moving towards the tube 170 unimpeded initially until it makes contact with the tube. Once the contact is established, the deformation is impeded causing the point 182 to start exerting pressure on the tube 170 locally near the point of contact. This pressure increases as the temperatures of cell 123 and deformation element 180 continue to increase. If this pressure exceeds the strength of the tube, the point 182 can puncture tube 170 (preferably comprising a soft or flexible material) allowing coolant 152 (e.g., a mixture of water and glycol) under pressure in tube 170 to spray outward and have direct contact with failing battery 123. Direct contact leads to a dramatically higher heat transfer rate than indirect contact, meaning coolant spray 153 can cool down failing battery 123 much quicker than systems that rely on indirect contact heat transfer. This is further aided by the fact that the cell could be hotter than the boiling point of the coolant 151 which leads to local boiling of the coolant spray 153. This phase change would absorb significant thermal energy from the battery. In some embodiments hot coolant 154 will pool at the bottom of battery unit 100. Other embodiments may drain coolant 154 into a bottom shell 130 or bottom conduit 135 or otherwise redirect the coolant 154 elsewhere. Some other thermal management systems have to provide a constant flow of fluid for indirect heat transfer. Because heat transfer with indirect contact is inefficient, a large supply of fluid is needed and must be constantly recirculated. For a typical electric car, this may mean that many liters of fluid are needed. However, in the embodiment of FIG. 4 direct contact between a failing battery and a fluid is possible. Direct contact and the potential for local boiling result in much higher heat transfer coefficients, leading to more efficient cooling of failing batteries, and lower fluid requirements.

As shown in FIGS. 1-4, embodiments under the present disclosure can provide, at least, thermal management, detection of abnormal cell heating and thermal runaway, and prevention of thermal runaway and its propagation as well as the fire spread in batteries. These functionalities usually have to be provided by distinct systems or technologies. However, for embodiments under the present disclosure all these functionalities can be provided by one system. Additionally, embodiments of the present disclosure include the ability to passively convert an indirect contact heat exchanger that provides thermal management into a direct contact heat exchanger that prevents thermal runaway and its propagation. Prior art systems have to use active systems to achieve similar functionality.

One aspect of certain embodiments under the present disclosure is a thermal management system (TMS), which generally refers to the cooling of batteries under normal operation conditions. This is usually based on forced air, heat pipes, phase change materials and "indirect contact" liquid heat exchangers. Embodiments under the present disclosure can provide TMS and indirect contact heat transfer during normal operation by directing fluid through the top conduit 145 and/or bottom conduit 135 (some embodiments can comprise only one conduit, top or bottom). In these embodiments the fluid can flow through the channels directly above and below the cells. Previous studies have shown that the thermal conductivity of Li-ion cells is anisotropic with heat transferring much faster in the axial direction (i.e., up and down) than in the radial direction. As a result, the described embodiments, with TMS via the top and bottom conduits and indirect contact heat transfer, is more effective than pre-existing solutions especially for larger cells due to the anisotropy of cell thermal conductivity. Fluid coolant can flow in the opposite directions in the top and the bottom channels to maximize the heat transfer and minimize the temperature gradient across each cell and the module. Aqueous solution-based heat exchangers typically yield heat transfer coefficients of the order of 100s of $W/m^2K$ per cell which are adequate for this application. A non-flammable liquid is preferred for heat transfer (such as water in warm weather regions and water/ethylene glycol solution in cold regions to prevent icing). The liquid may either be cooled (using an external chiller for operation on warm days) or heated (for cold start on a cold day). The channel wall material of construction, wall thickness, channel height, liquid flow rate and the chiller design can be optimized to ensure that (i) the battery pack remains between 10° and 40° C. where the Li-ion battery performance remains optimal (or a different temperature range depending on battery type), and (ii) the maximum temperature differential across each cell remains below, e.g., 5° C. (a current Department of Energy requirement for TMS). Since the battery temperatures are relatively low, the indirect contact heat transfer described in FIGS. 1-4 provides sufficient heat transfer for optimum battery functionality during normal conditions.

Another aspect of certain embodiments under the present disclosure is a mechanism to detect abnormal cell heating and thermal runaway in each cell in a battery pack. Certain embodiments include detection accomplished with deformation elements. In certain embodiments the bottom half of a long vertical deformation element can be attached to the external surface of each battery cell as shown in FIGS. 1-4. This can ensure that the element remains in thermal equilibrium with the cell external surface when the cell temperature remains within a desired operating range. If the cell heats up significantly above the normal operating range (say, >100° C. due to manufacturing defects, abnormal use, or abuse), the top of the deformation element bends away from the cell as illustrated in FIG. 4.

The embodiment of FIG. 4 can further include an electrical connector 187 that connects all the deformation elements 180 together under normal conditions, and another electrical connector 188 that connects all the plastic tubes together. Under normal conditions, the connectors 187 and 188 are electrically isolated from each other. If the cell 123 and the deformation element 180 heat up above the normal operating range for the battery (say, to 100° C.) the deformation element 180 deforms away from the cell 123 so that the tip 182 establishes contact with the tube 170 which in turn electrically connects deformation element connectors 187 with the tube connectors 188. This conversion from an open circuit between 187 and 188 to a closed circuit provides "passive" detection of abnormal cell heating which is usually a precursor to thermal runaway in the failing cell. Closing of the circuit between bimetal connector 187 and tube connector 188 can also be used to optionally connect to other circuits, circuitry for decoupling failing batteries from the system, and/or controllers or other components. This circuit 187 also can be made to electrically disconnect the module with the "hot" cell from the rest of the battery pack, so that the failure remains localized within the module that contains the hot cell and does not propagate to the other modules electrically, and the pack continues to function and power the host system. This embodiment can be modified slightly (for example, by moving the connector 188 to a location on the cell outer surface near the top of the undeformed deformation element) to reverse the circuit to closed under normal operation and to open when the cell heats up abnormally. This circuit can be used to initiate various events such as informing about the failure and the state of the battery pack as well as provide possible corrective actions. A single module, unit or system can comprise multiple circuits and/or types of circuits.

A further aspect of embodiments under the present disclosure is a system that prevents thermal runaway of hot cell(s), propagation of thermal runaway to the other cells, and fire propagation in the battery pack. In the description, e.g., of FIGS. 1-4, it is assumed that there is only one "hot" cell, but embodiments of the present disclosure can work well even if multiple cells in the battery pack become hot simultaneously. Embodiments hereunder can achieve thermal runaway prevention by using thermal deformation of the deformation element 180 (discussed above) to unlock an opening in the coolant tube 170 close to a hot cell 123. Opening the tube 170 can be achieved through several methods or means, depending on whether the opening needs to be temporary or permanent. For example, point 182 on deformation element 180 can puncture a hole in tube 170 to create a permanent opening. Alternatively, the deforming deformation element 180 can open a valve or push/pull a latch temporarily to discharge the coolant directly on the surface of the hot cell 123. By using the deformation element to activate a flow of fluid coolant from the indirect contact heat transfer on the top and/or bottom plates 140, 130, coolant is discharged only near the hot cell. This mechanism converts an "indirect contact" liquid heat exchanger in which the liquid undergoes sensible heat gain via the walls of the top and/or bottom shells into a "direct contact" heat exchanger in which the coolant sprayed on the hot surface draws the sensible heat and potentially the latent heat from the cell (depending on the cell temperature at the time of contact between the fluid and the cell). The rapid heat transfer and the large latent heat ensures that the cell quenches rapidly down to the safe level. Switching from indirect to direct contact mode increases the heat transfer coefficient by almost an order of magnitude and switching from sensible heat gain to boiling heat transfer improves the heat transfer coefficient even further due to the high latent heat of vaporization of the fluid and the turbulent mixing generated by the vapor bubbles moving through the liquid. Heat transfer coefficients up to 25,000 $W/m^2K$ or more can be obtained with direct contact evaporative cooling systems (compared to 100s of $W/m^2K$ for indirect contact sensible heat transfer). This process rapidly quenches the hot cell. The coolant discharge through the channel opening can continue so long as the cell 123 remains hot. When the cell cools down sufficiently, the thermal deformation in the deformation element 180 reverses. In some catastrophic events, or if a deformation element is deformed too much, the deformation element might not return to its original shape. This reversal closes the valve to shut down the coolant discharge from the tube in the temporary discharge configuration presented above. In the permanent discharge configuration where the coolant tube has been penetrated by the tip, an additional mechanism such as a liquid level gauge can be used to stop the coolant flow into the affected module. Quenching of the hot cell surface dramatically cuts down the heat transfer to the neighboring cells preventing thermal runaway propagation as well as fire spread. Any toxic gases/chemicals released from the hot cell 123 through the vent are scrubbed by the liquid coolant. Any residual liquid 154 that remains after this step collects initially within the confinement walls around the module as shown in FIG. 4. After the thermal runaway has been prevented and the coolant discharge stops, a valve 158 at the bottom of the battery module shown in FIG. 4 can open, draining the coolant 154 that collects in the module and returning it to the main coolant reservoir or to an auxiliary collection tank. This can ensure that the thermal runaway and fire prevention component is turned on passively on demand, and it operates only as long as it is necessary. Since the "hot" cell 123 module is turned off and electrically isolated from the battery pack, the coolant discharge into the region surrounding the cells does not cause any short circuiting in the system. The short duration of this exposure also minimizes any corrosion issues in the battery pack. Potential for corrosion and short circuit is the main reason for not using direct contact heat exchangers in batteries. But the unique functionalities of embodiments under the present disclosure can ensure that this mechanism is turned on only when there is potential for battery fire at which point saving the rest of the battery pack and the host system is more important than the possible damage due to issues such as corrosion in one module of the battery pack.

As set forth above, embodiments under the present disclosure can serve both the low heat flux functions (cooling and heating of batteries during normal battery operation) and extremely high heat flux functions (prevention of thermal runaway in the failing cell, prevention of thermal runaway propagation to the other cells in the battery pack, and prevention of fire spread) with an automated system that transforms the former to the latter without operator intervention.

Embodiments under the present disclosure can be cell agnostic and can be applied to any battery chemistry, format, and size. They can further eliminate any battery fire irrespective of the trigger mechanism. Certain benefits of the proposed solutions include:

Improved battery efficiency which can save energy cost over the lifetime of the battery.

Reduction in battery degradation. Current Li-ion batteries experience loss in capacity per charge-discharge cycle which can be lowered with certain embodiments of the present disclosure. This extends the cycle life and reduces the battery replacement cost.

Elimination of battery fires and the associated loss of lives and property.

Safety improvement with this invention reduces the need for some of the redundant and ineffective safety mechanisms that are used in current Li-ion cells. Prior art safety mechanisms make the cells much more expensive. Therefore, the batteries made from cells with fewer safety measures may cost ~28% less.

The volume occupied by the inactive material used for the prior art safety mechanisms can be replaced with cathode and anode material which increases the cell energy density. For example, replacing the thick-walled multi-layered polymeric separator layer with a thin single layer separator can save 3% of the battery volume.

Prevention of thermal runaway makes it feasible to build the battery pack from high-capacity cathodes and anodes and using larger individual cells. Use of large format cells will further reduce the inactive material (such as the battery terminals, cell walls, connectors, etc.) and the dead space between the individual cells—increasing the energy density and specific energy of the battery pack.

As a result, the current disclosure enables the fabrication of high performing, long lasting, large-format, energy dense and energy efficient Li-ion batteries that are safe against hazards from manufacturing defects, accidents, and abuse.

Embodiments under the current disclosure can utilize a variety of fluids including coolants, liquids, and nanofluids. An ideal fluid is stable, non-flammable, non-corrosive, non-toxic, inexpensive, and would have a low viscosity, low density, a neutral pH, a low freezing point, a low boiling point, and a high latent heat of vaporization. Preferred embodiments utilize distilled or filtered water mixed with glycol to make a solution that has 0-40% glycol is an acceptable fluid falling within many of the parameters when employed in conjunction with Lithium-ion batteries. Other possible candidate fluids, coolants, and liquids include mineral oil, nanofluids with nanoparticles suspended in aqueous solutions, aqueous vermiculite dispersions, liquids that can generate fire suppression foams, and other non-flammable materials. In general, it is preferred that the chosen fluid will boil when directly contacting a hot cell, often occurring around 100° C. Boiling fluids, combined with direct contact, have high heat transfer coefficients and so boiling will bring the most efficient and quickest cooling.

As discussed above, a variety of shapes, lengths, and designs of bimetals or shape memory alloys are possible. The following sets forth a variety of possible embodiments under the present disclosure.

Figure 5:
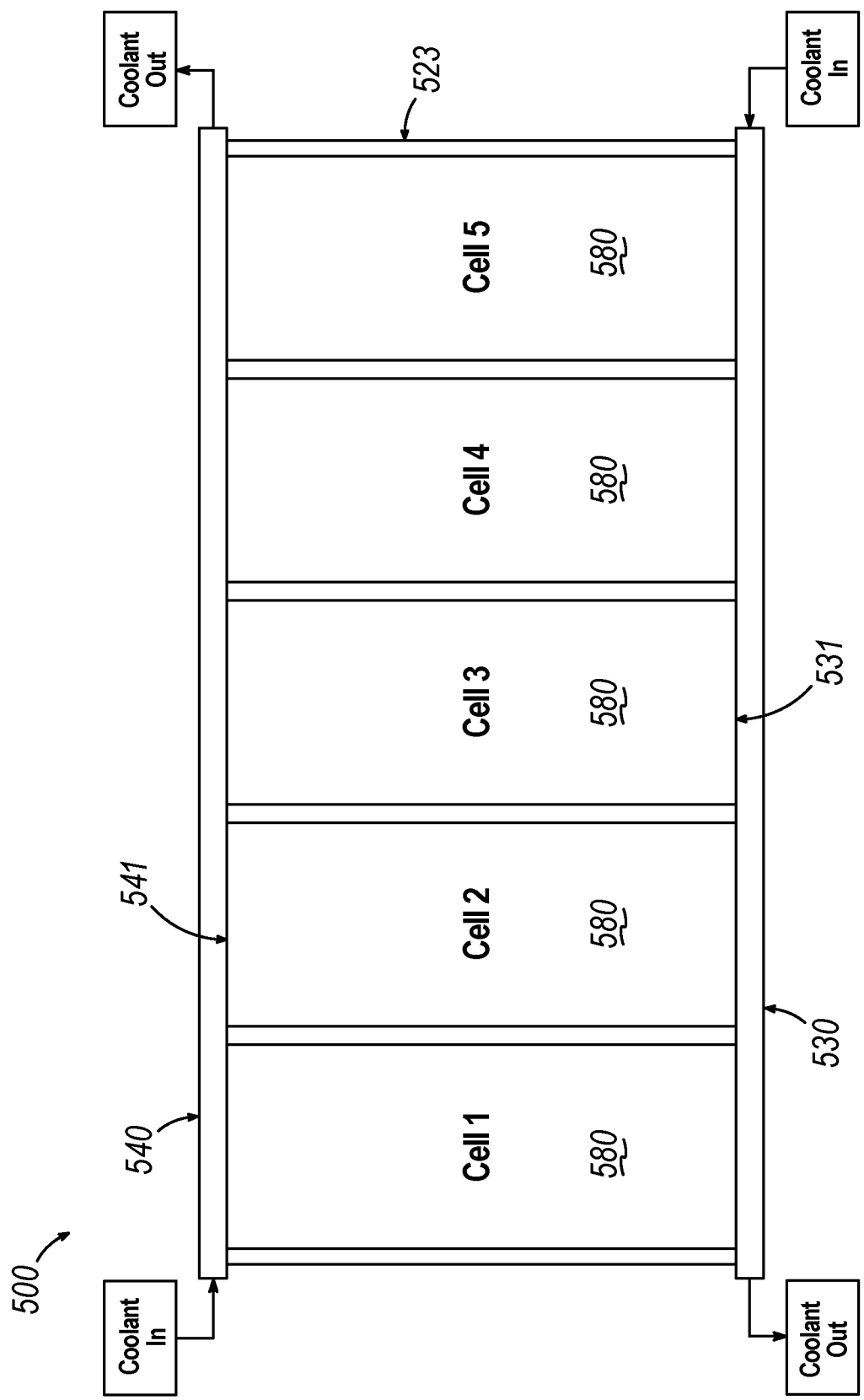
FIG. 5 shows a diagram of a battery module embodiment under the present disclosure.
Figure 6:
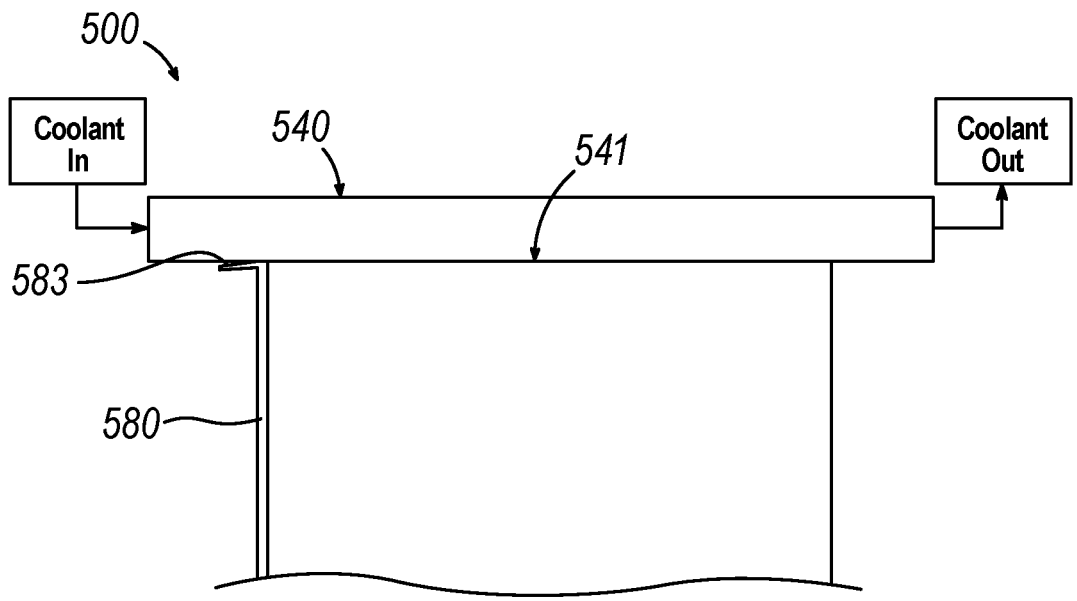
FIG. 6 shows a diagram of a battery module embodiment under the present disclosure.
Figure 7:
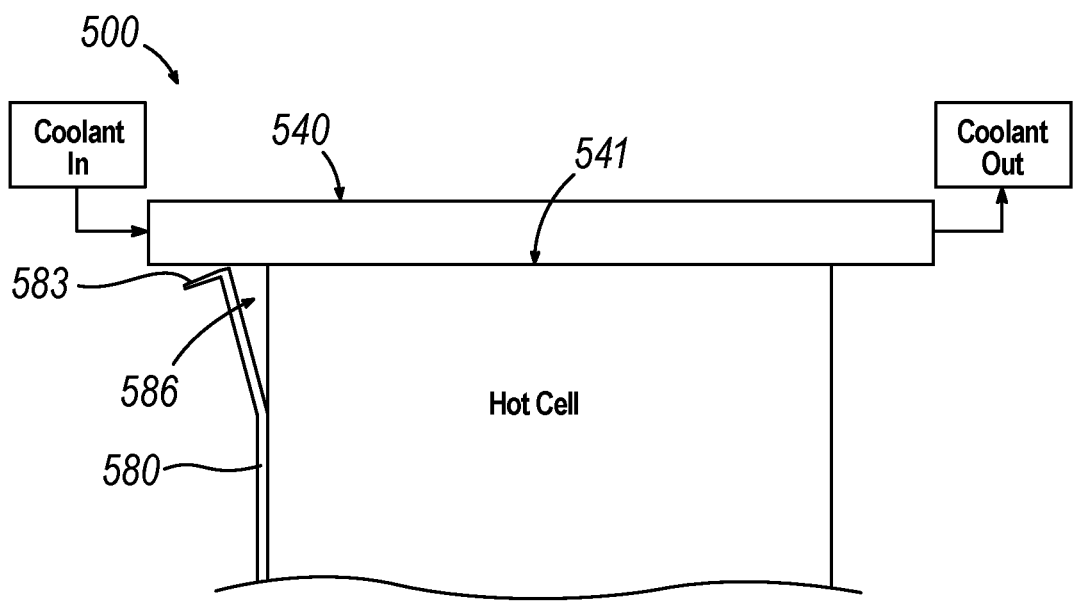
FIG. 7 shows a diagram of a battery module embodiment under the present disclosure.

FIGS. 5 to 7 show one possible embodiment. Battery module 500 comprises cells 1 to 5. Deformation elements 580 are coupled to each cell 1-5. Solid metal or plastic walls 523 surround module 500. Other battery modules 500 can be coupled together to form a larger battery system. Top shell 540 and bottom shell 530 allow coolant to flow in opposite directions providing thermal management via indirect contact heat transfer along top surface 541 and bottom surface 531 during normal operation of module 500. FIG. 6 shows a close up of the top surface 541 of e.g., cell 2. Deformation element 580 is coupled to cell 2 and lateral extension 583 extends along top surface 541 and blocks coolant from flowing onto cell 2. FIG. 7 shows cell 2 experiencing failure and becoming hot. As deformation element 580 is heated it bends away from cell 2, displacing lateral extension 583 and providing an opening 586 for coolant to exit the top plate 540 and provide cooling to cell 2. When cell 2 cools down the deformation element 580 can return to its old position, returning the lateral extension 583 to its original position to close the opening and blocking the coolant outflow from the top shell.

Figure 8B:
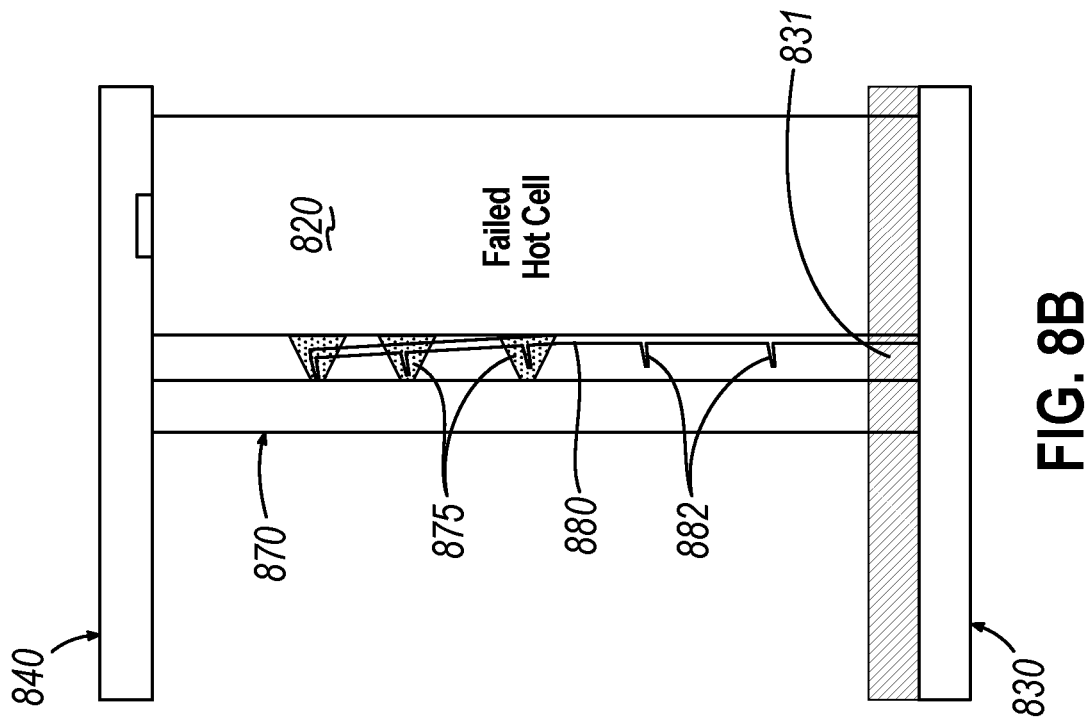
FIGS. 8A-8B show an example of a battery module embodiment under the present disclosure.
Figure 8A:
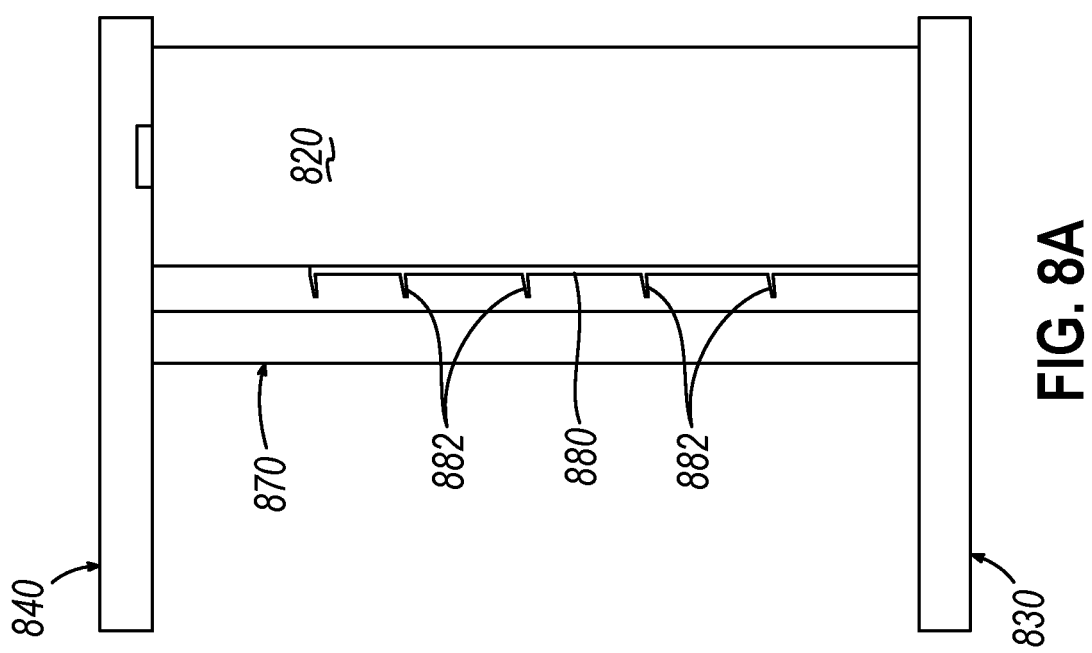

FIGS. 8A and 8B show another further possible embodiment. FIG. 8A shows a battery 820 in normal operation, with a deformation element 880 with points 882, top shell 840, bottom shell 830, and coolant tube 870. Fluid flowing through the top and the bottom conduits provide thermal management of the cells during normal operation. As battery 820 undergoes failure in FIG. 8B, deformation element 880 deforms and points 882 penetrate the tube 870 at multiple locations discharging the liquid sprays 875 directly on the surface of the hot cell 820. One benefit of the embodiment of FIGS. 8A and 8B is that the greater the failure of battery 820, the higher its temperature will be, and the greater the deformation of deformation element 880, which will lead to more of points 882 puncturing tube 870 and more coolant 875 being sprayed onto battery 820 for faster cooling. Pooled coolant 831 can be drained away after cooling.

Figure 9:
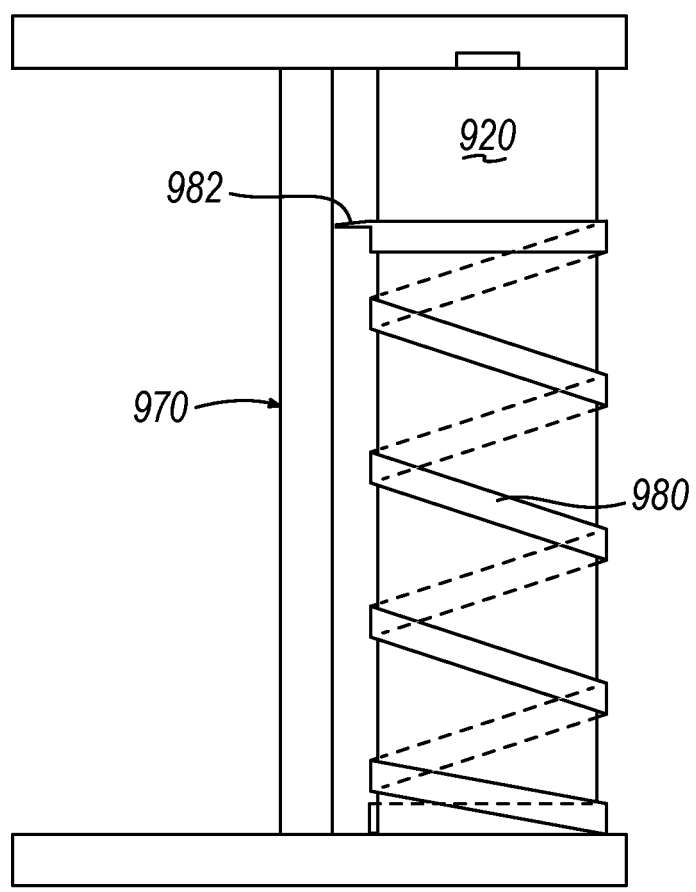
FIG. 9 shows a diagram of a spiral-based battery module embodiment under the present disclosure.

FIG. 9 shows a further possible embodiment. Here a battery 920 is coupled to a spiral-shaped deformation element 980. Fluid flowing through the top and the bottom conduits provide thermal management of the cells during normal operation. Edge 982 can extend from a top surface of element 980. As deformation element 980 deforms when heated by the cell the edge 982 can cut/puncture/move a valve on tube 970 to release coolant. Spiral-based elements may be desired depending on e.g., the bimetallic materials available. For example, certain bimetals may not provide enough deformation at the expected temperatures in an embodiment such as described with regard to FIG. 4. Using a spiral shape can provide a longer length of bimetal and greater total deformation as well as a greater local pressure to puncture the coolant tube. Length, shape, thickness (laterally and vertically), and position may all need to be adjusted depending on the specific configuration of the battery cells, modules, packs, and systems, and based on availability of material for the deformation elements. Environment can also play a role: cold environments, humid or dry, etc.

Figure 10B:
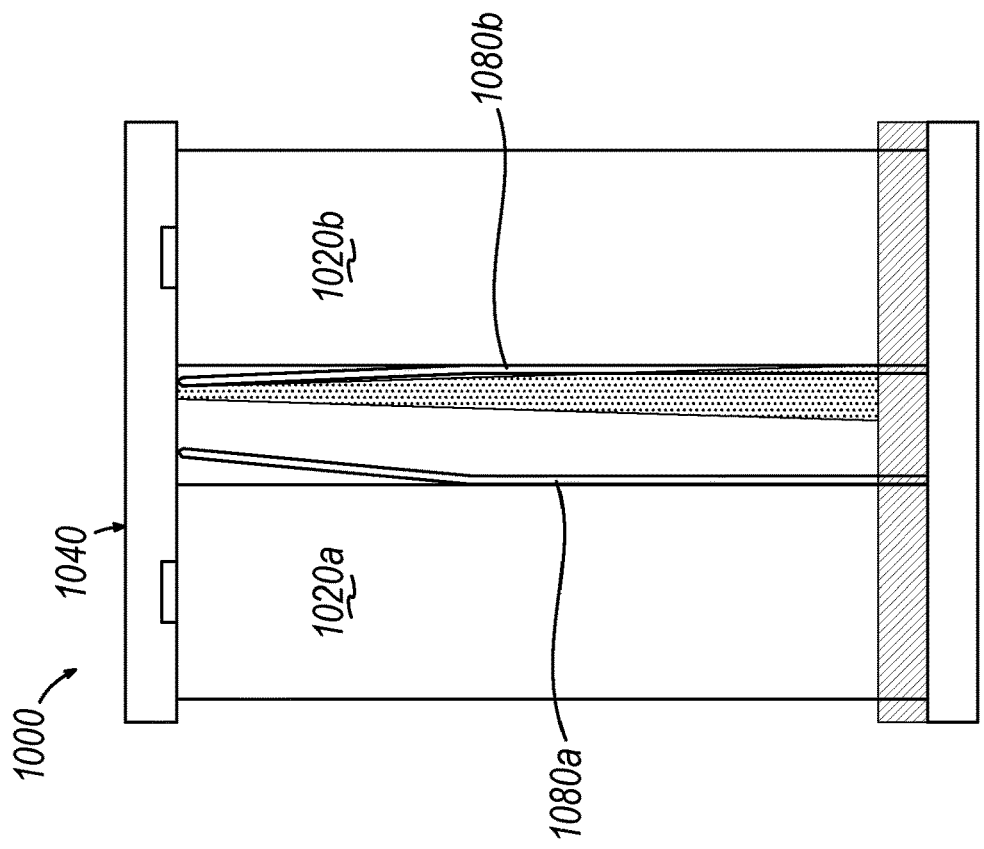
FIGS. 10A-10B show an example of a battery module embodiment under the present disclosure.
Figure 10A:
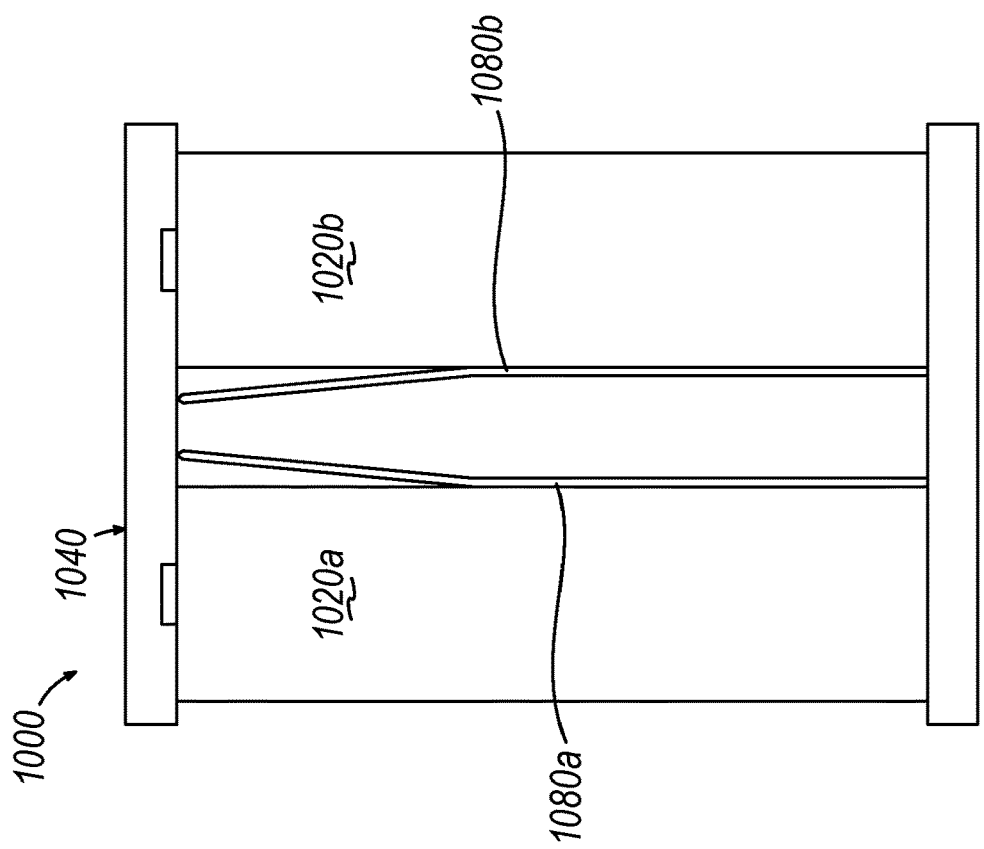

FIGS. 10A and 10B show another possible embodiment. Here, during normal operation (FIG. 10A) the deformation elements 1080a/b extend along a lower portion of batteries 1020a/b and then extend inward (in this view) reaching close to top shell 1040. Fluid flowing through the top and/or bottom conduits 1040 and 1050 provide thermal management of the cells during normal operation. As one battery 1020b heats up due to some type of failure, its deformation element 1080b deforms by bending inward toward battery 1020b and puncturing/poking/moving a valve in top shell 1040 and thereby releasing coolant. Deformation element 1080b can in some embodiments cause a permanent break in top shell 1040, and in other embodiments simply move a valve, with the element 1080b allowing the valve to return to its normal position after the cell 1020b and its element 1080b cool down.

Figure 11:
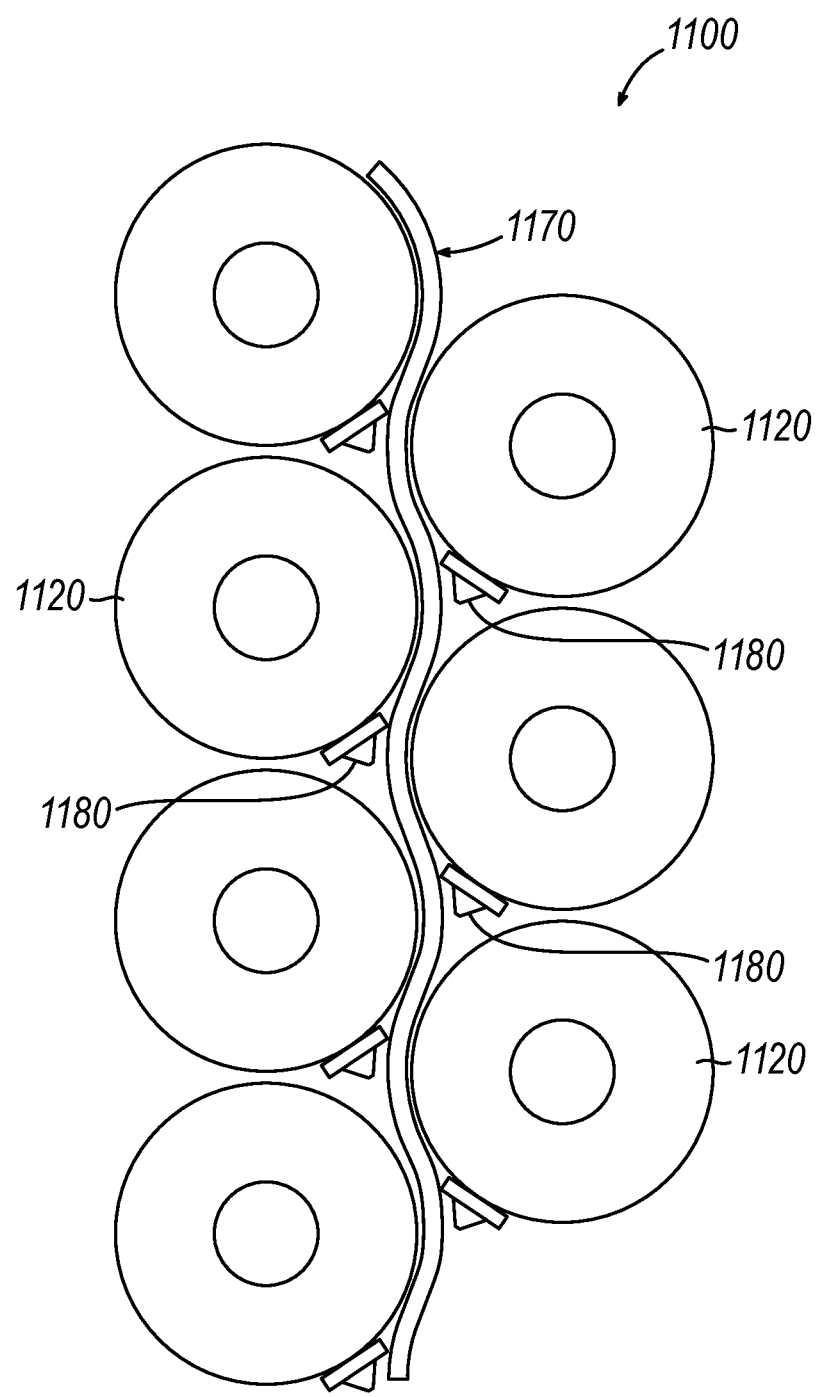
FIG. 11 shows a diagram of a battery module embodiment under the present disclosure.

FIG. 11 shows a further embodiment under the present disclosure. Battery module 1100 comprises a plurality of batteries 1120. The view shown is a top-down view. A coolant channel 1170 makes a serpentine-like path through the gap between the batteries 1120. Coolant channel 1170 can extend vertically along the entire battery, or for just a portion, and can be disposed near the top, bottom, or middle of batteries 1120. Fluid flowing through the serpentine channel 1170 provides thermal management of the cells during normal operation. Deformation elements 1180 can be coupled to the batteries 1120 and can be configured to deform and puncture/cut/release a valve or perform another action so as to release the coolant fluid from the serpentine conduit 1170 onto an overheating battery 1120 to induce direct contact cooling.

Figure 12:
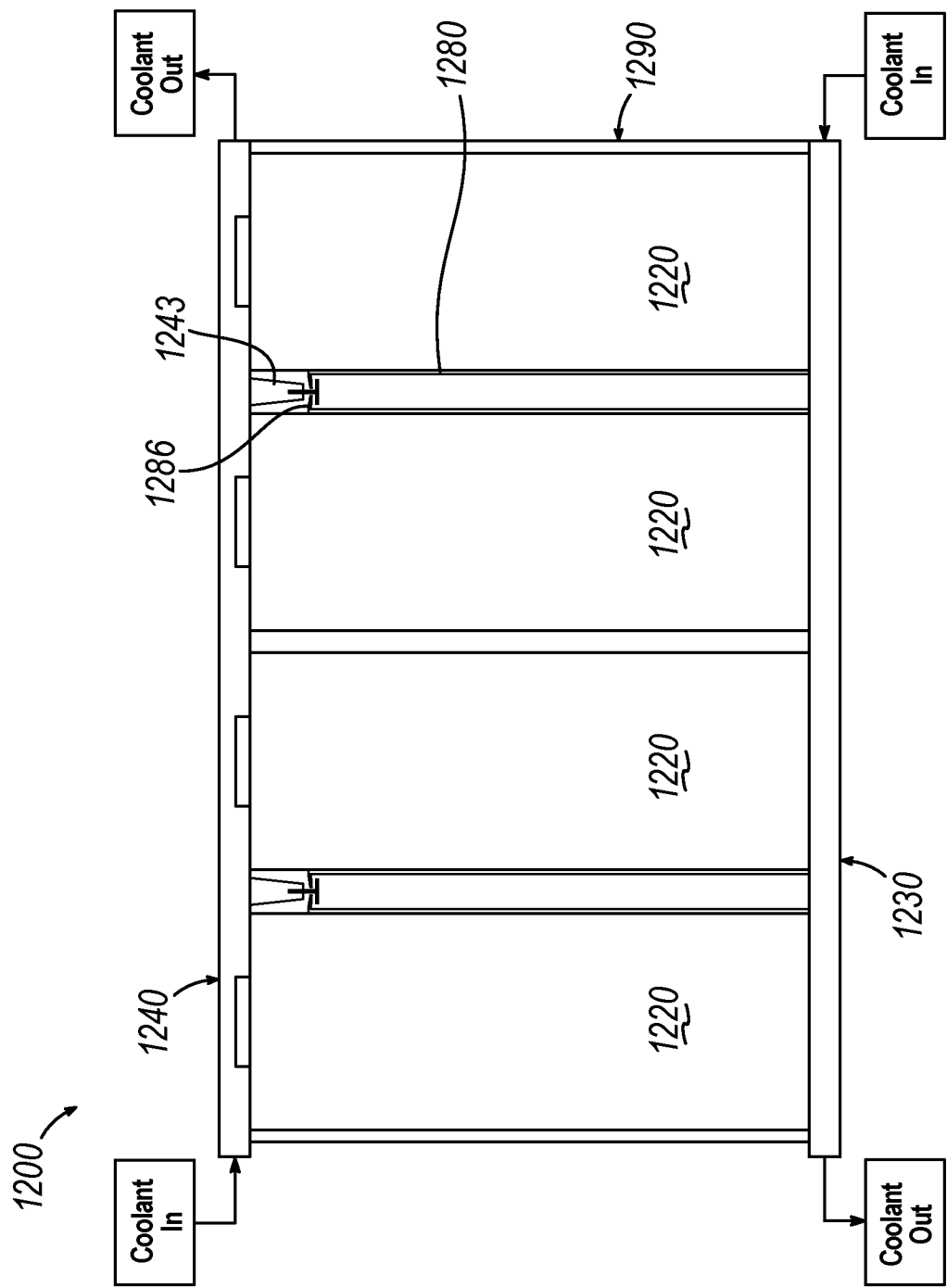
FIG. 12 shows a diagram of a nozzle-based battery module embodiment under the present disclosure.

FIG. 12 illustrates a possible embodiment with nozzle connections to a coolant supply. Battery module 1200 comprises a plurality of batteries 1220, a top shell 1240, and a bottom shell 1230. Coolant passes through top shell 1240 and/or bottom shell 1230 during normal operation and provides thermal management of the batteries via indirect contact heat transfer. Solid walls 1290 contain the battery module 1200. Nozzles 1243 extend downward from top shell 1240. Deformation elements 1280 extend along the surface of batteries 1280 and comprise a small hook, point, or extension 1286 on a top end. If a battery cell 1220 experiences a failure and heats up (e.g., greater than 100° C.), then the deformation element 1280 can deform causing extension 1286 to engage and displace a portion of nozzle 1243 and supply a stream of coolant onto the failing battery 1220. When deformation element 1280 cools down it can return to its original position and the nozzle 1243 can be turned off. Other embodiments could comprise a nozzle coupled to the bottom plate 1230.

Figure 13:
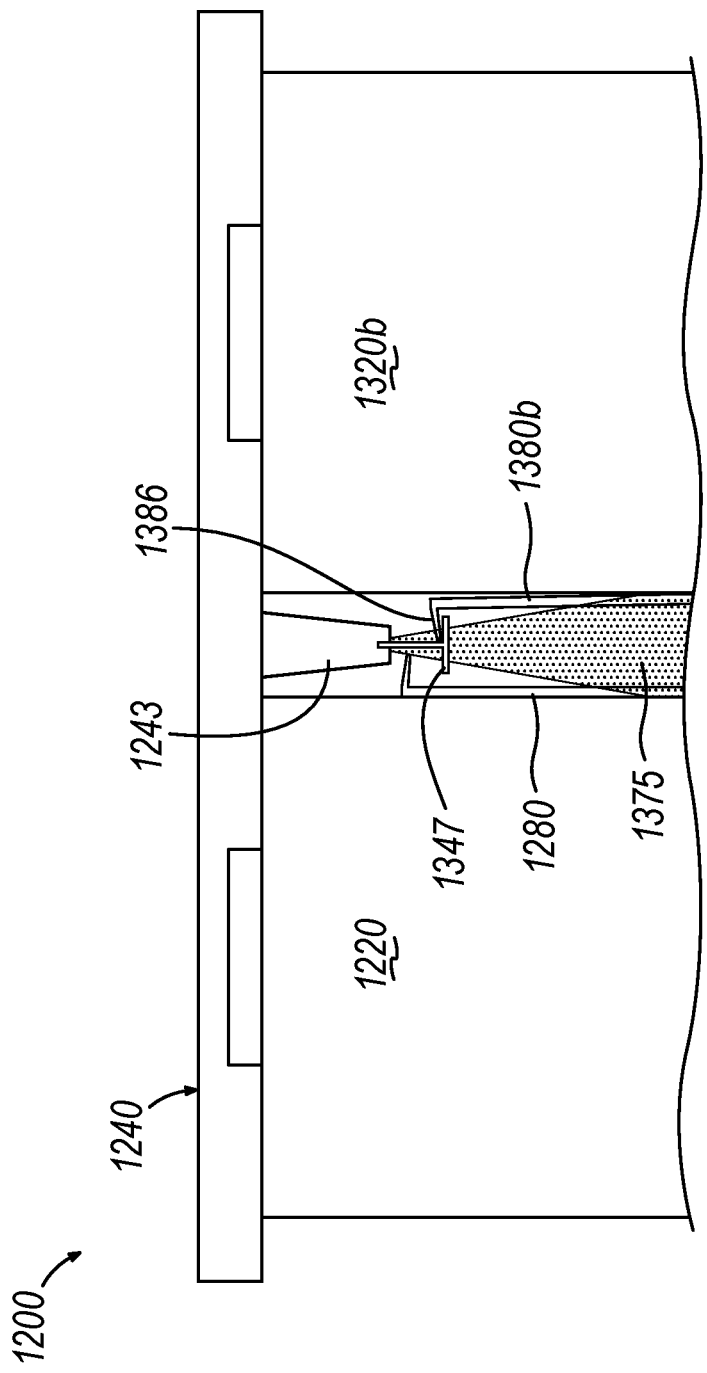
FIG. 13 shows a diagram of a nozzle embodiment under the present disclosure.

FIG. 13 shows a possible embodiment of nozzle 1243 of FIG. 12. As battery 1320b heats up, the deformation element 1380b also heats up. Extension 1386 can dislodge or pull down on T-section 1347, thereby unblocking an opening in nozzle 1243. Coolant 1375 sprays outward to help cool down battery 1320b.

Figure 14B:
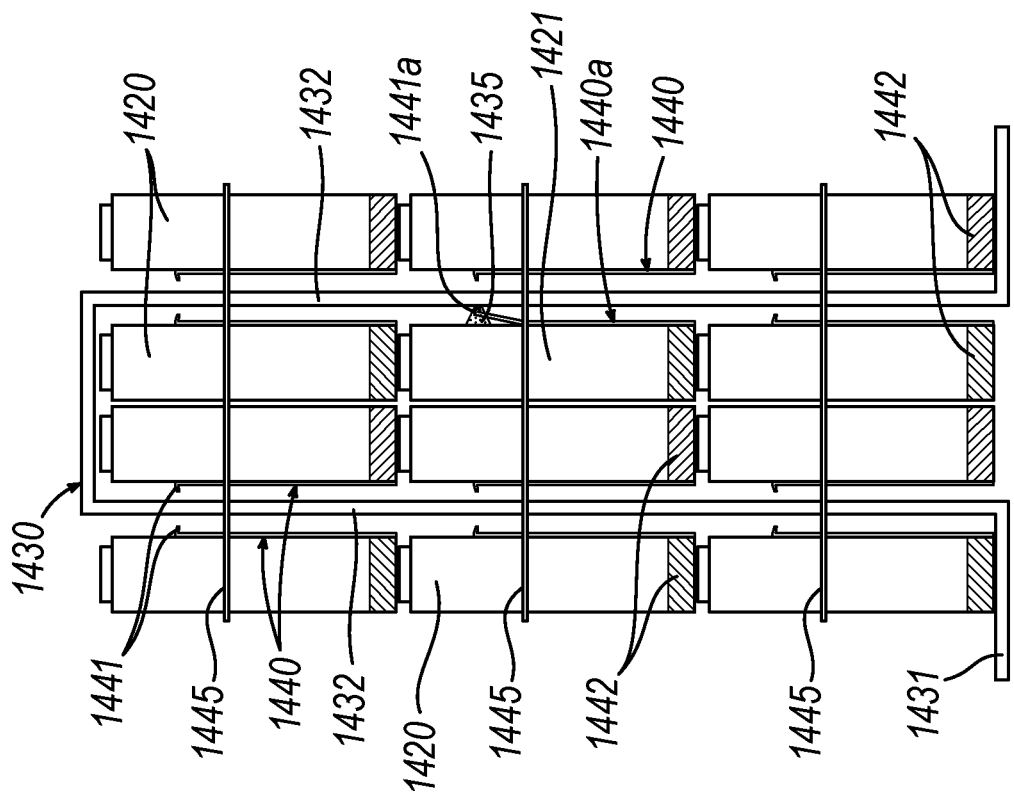
FIGS. 14A-14B show a diagram of a possible battery module or unit embodiment under the present disclosure.
Figure 14A:
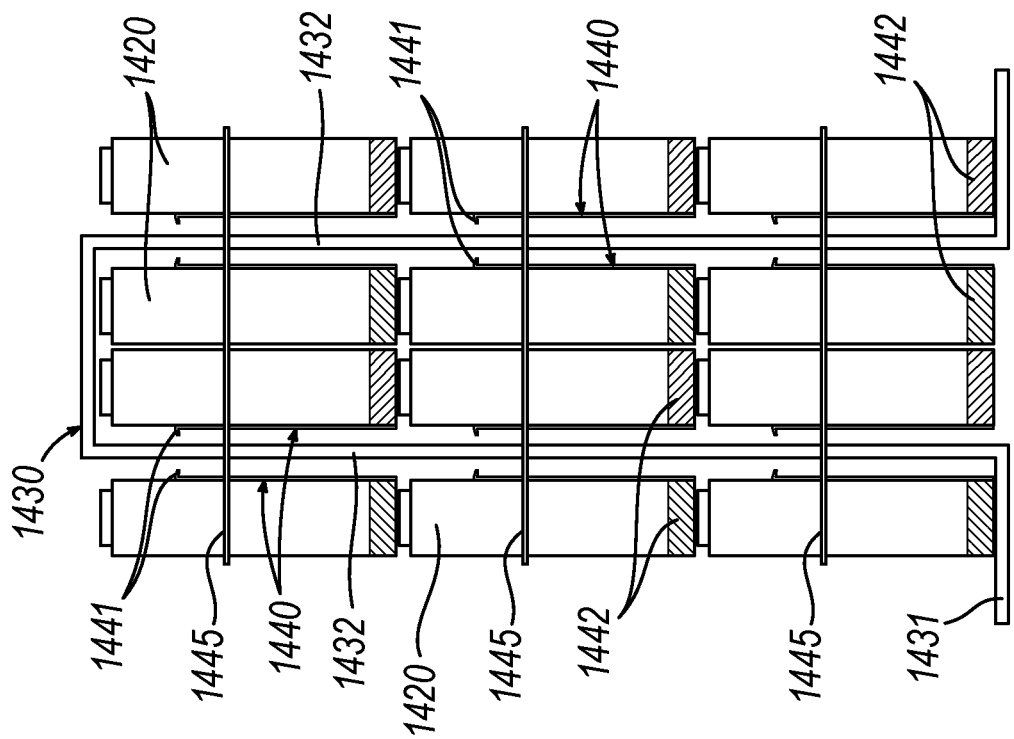

FIG. 14A shows another possible embodiment for the provision of abnormal battery heating and thermal runaway prevention in the failed cell, and thermal runaway propagation prevention to the other batteries in the pack. Individual battery cells 1420 are stacked on top of each other in this embodiment. The coolant fluid from a storage tank is conditioned and is pumped into the tubes 1430 arranged horizontally below and/or above a stack of batteries and vertically 1432 in the gaps between the batteries 1420. The temperature sensitive deformation elements 1440 are anchored to the individual batteries 1420 using supports 1442. Support structure 1445 ensures that the vertical tubes and the cell stacks remain vertical and provides rigidity to the tubes. As battery 1421 heats up (FIG. 14B), the deformation element 1440a attached to that battery also heats up and deforms towards the vertical coolant tube closest to it. Extension 1441a attached to that deformation element 1440a penetrates the tube discharging the coolant directly on to the surface of the hot battery 1421 to induce rapid cooling via direct contact heat transfer that may involve both sensible and latent heat gain by the coolant. Since this embodiment does not provide the thermal management function, only a small amount of coolant fluid necessary to provide thermal runaway and propagation prevention is needed. Similarly, other described embodiments could avoid the use of top or bottom conduits for thermal management, and could focus more on prevention of thermal runaway, abnormal battery heating, fire, etc.

As shown, the deformation elements can take a variety of forms. What shape or size of bimetal or shape memory alloy can be used will depend on material availability, size of batteries, desired reaction to certain temperatures, cost, and other factors. Some batteries are cylindrical with a diameter of only 18 mm. Others have different shapes and could be much smaller or larger. The amount of deformation or bending needed can depend on delivery mechanism for coolant: tube, top plate, serpentine tube, nozzle, etc. Typically for Li-ion batteries 100° C. marks the failure of the battery and with little risk of false alarms. But other battery technologies may call for different temperature ranges. In one tested embodiment, a 60 mm long 721Cu5 bimetallic element deformed by 2 mm at 100° C. With this particular embodiment, it was found that spiral shaped bimetallic element worked best. But other embodiments are possible.

Using embodiments under the present disclosure, Applicant has found that the entire energy released during thermal runaway can be extracted with ~17 g of water for a fully charged 18650 cell and with ~22 g for a fully charged 26650 cell. These are relatively small amounts and can be easily provided to the desired battery area provided that the detection and discharge occur locally. If the detection occurs early (for example, when the cell reaches ~100° C.), the coolant can be supplied to the failing cell at a slow rate. Note that these values are for water and may differ depending on coolant composition in a specific embodiment. Assuming that the cell needs 10 seconds to reach thermal runaway (after it reaches a temperature of 100° C., depending on the specific embodiment), the water needs to be supplied at—0.03 gallons per minute or GPM (for 26650 cells) for less than a minute. It is to be noted that the cooling of the cell induced by the discharge of water slows down the exothermic reactions and extends the time for complete reactions significantly. This is in contrast to the approach used in some stationary battery installations (for example, in microgrids) where the fire suppression system is located outside the battery pack and is activated only after a noticeable flame escapes the battery pack. As a result, those systems require much larger amounts of water discharged at high rates to extract the heat released from the entire pack. For such systems, assuming that thermal runaway in a single 26650 cell propagates throughout the battery pack (with 4,000 cells) before the fire protection system is activated, more than 100 GPM of water needs to be supplied for several minutes to control the fire. This is because it takes a finite time for water to permeate through the various layers of the outer system and the battery pack casing to reach the individual cells. Most of the supplied water may never reach the cells and is wasted. The much larger water supply needed in such systems may not be feasible in most mobile applications with space and weight constraints (like the aircraft). It is clear that the lower amounts of water/coolant under the present disclosure can conserve resources when compared to alternative solutions. Table 1 shows typical water/coolant requirements for several battery embodiments experiencing thermal runaway under the present disclosure.

TABLE 1

| Cell size | Amount of water needed to extract energy released from thermal runaway | Water flow rate needed to prevent thermal runaway propagation |
| --- | --- | --- |
| 18650 | 17 grams | 0.027 gallons/minute |
| 26650 | 22 grams | 0.035 gallons/minute |

Figure 15:
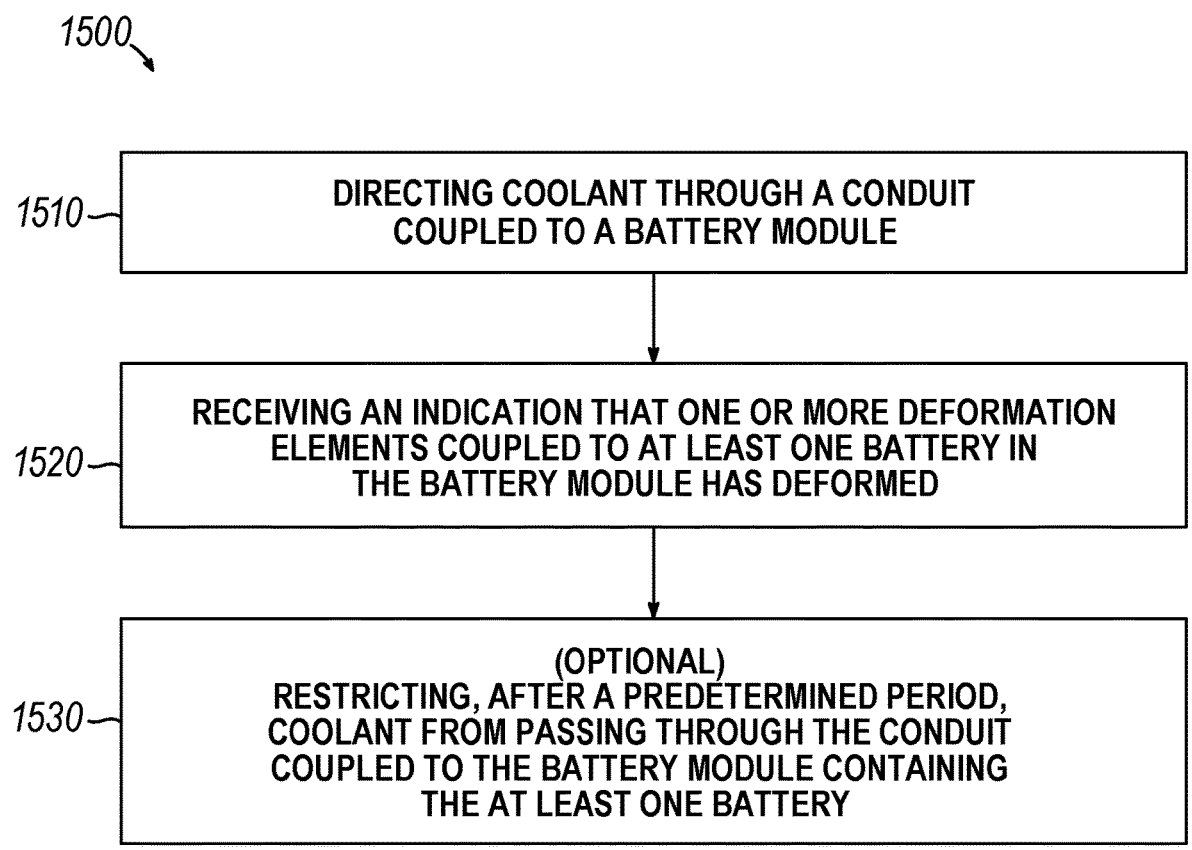
FIG. 15 shows a diagram of a possible method embodiment under the present disclosure.

FIG. 15 displays one possible method embodiment 1500 under the present disclosure for thermal management, abnormal cell heating and thermal runaway detection and fire prevention in a battery module. Step 1510 is directing coolant through a conduit coupled to a battery module. Step 1520 is receiving an indication that one or more deformation elements coupled to at least one battery in the battery module has deformed (which can serve as a passive detection of abnormal cell heating). This can help with monitoring the battery state of health and alerting the system operator or battery monitoring system about the failure event. For example, a computer system comprising an electric vehicle could receive the notification that deformation has occurred, indicating an unsafe temperature or environment. Step 1530 (optional) is restricting, after a predetermined period, coolant from passing through the conduit coupled to the battery module containing the at least one battery. The predetermined period could be chosen so as to allow the coolant to have its effect in the subject battery module. The time chosen could be any appropriate amount of time: 0.5 s, 1 s, 10 s, or another period.

Figure 16:
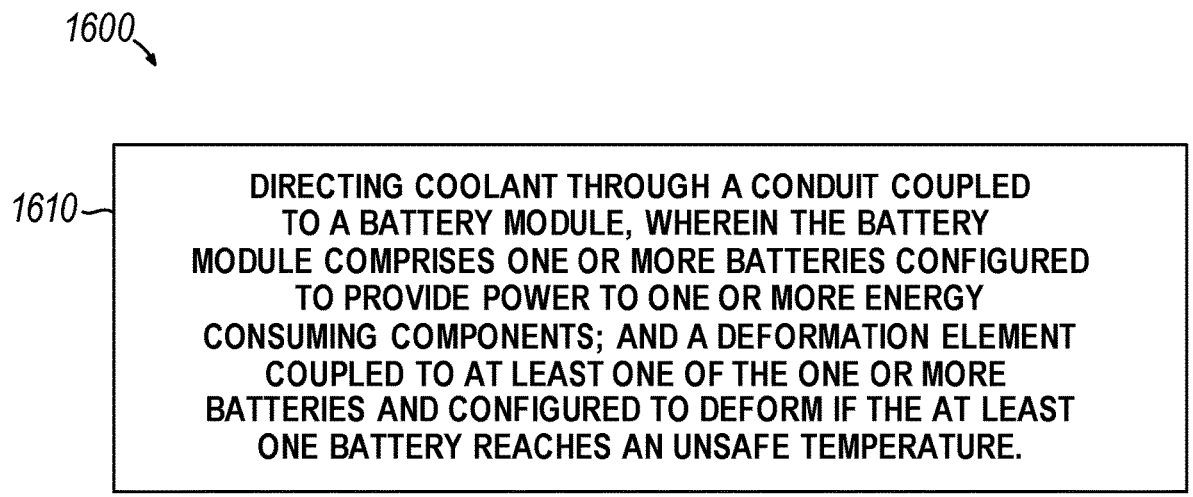
FIG. 16 shows a diagram of a possible method embodiment under the present disclosure.

FIG. 16 displays another possible method embodiment 1600 under the present disclosure for operating a battery module. Step 1610 is directing coolant through a conduit coupled to the battery module. This battery module is characterized in that it comprises; one or more batteries configured to provide power to one or more energy consuming components; and a deformation element coupled to at least one of the one or more batteries and configured to deform if the at least one battery reaches an unsafe temperature. The conduit can be configured to direct coolant along a surface of the battery module, such that when the deformation element deforms it causes coolant from the conduit to be directed onto the at least one battery.

Figure 17:
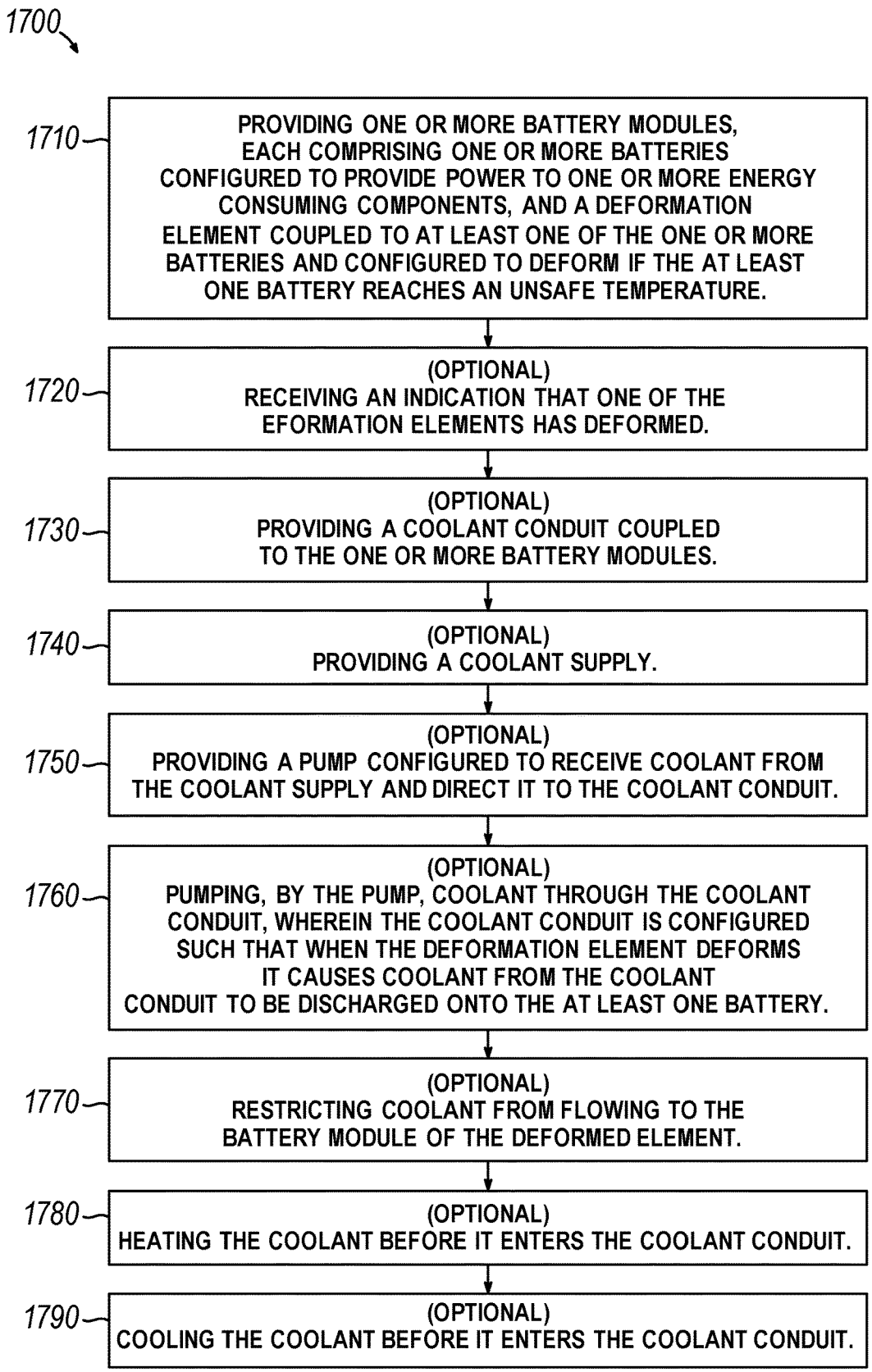
FIG. 17 shows a diagram of a possible method embodiment under the present disclosure.

FIG. 17 displays a further possible method embodiment of operating or constructing a battery system 1700 under the present disclosure. Step 1710 is providing one or more battery modules, each comprising one or more batteries configured to provide power to one or more energy consuming components; and a deformation element coupled to at least one of the one or more batteries and configured to deform if the at least one battery reaches an unsafe temperature. The battery modules can optionally be vertically stacked and comprising supports and support structures to hold the battery modules or batteries together. Optional step 1720 is receiving an indication that one of the deformation elements has deformed. Optional step 1730 is providing a coolant conduit coupled to the one or more battery modules. The coolant conduit can optionally comprise a serpentine path, a conduit through top and/or bottom shells, a path amongst vertically stacked batteries or battery modules, or another type of conduit. Optional step 1740 is providing a coolant supply. Optional step 1750 is providing a pump configured to receive coolant from the coolant supply and direct it to the coolant conduit. Optional step 1760 is pumping, by the pump, coolant through the coolant conduit; wherein the coolant conduit is configured such that when the deformation element deforms it causes coolant from the coolant conduit to be discharged onto the at least one battery. Optional step 1770 is restricting coolant from flowing to the battery module of the deformed elements. Optional step 1780 is heating the coolant before it enters the coolant conduit. Optional step 1790 is cooling the coolant before it enters the coolant conduit.

Embodiments have described coolant tubes within the battery modules. There may also be tubes, valves, gates and/or other components connecting battery modules together. Gates or valves may be controllable by a control system to e.g., restrict flow to a battery module with a failed battery and/or deformed bimetallic element or shape memory alloy. Coolant tubes may comprise a rubber, plastic, or other material. If a specific embodiment uses a bimetallic element or shape memory alloy to puncture or otherwise break the tube, then the tube will preferably be constructed of a suitable material capable of being broken in the chosen way.

The deformation elements described herein may comprise a sharp point or be coupled to a blade or other type of sharp edge. The sharp point, sharp edge or blade could comprise bimetals, shape memory alloys, metals, plastics, alloys, or other suitable materials. In some embodiments, the sharp edge could comprise a separate component (not fixedly attached to a deformation element) that is pushed by the deformation element into the coolant tube.

Battery modules, cells or groups of cells under the present disclosure are preferably enclosed in a structure. Structures can comprise top and bottom shells or plates; lateral walls, shells or plates; and other vertical or horizontal structures. Enclosures are preferably metal, plastic, or other suitable materials. This helps to isolate failed battery cells from other functioning battery cells and can help restrain coolant leaking onto other cells or modules. Battery modules can comprise gutters at or near a bottom edge to remove coolant after discharge. Battery modules and systems can further comprise volume gauges to measure the amount of coolant collecting in the enclosure structure.

Generally, a battery or battery cell refers to an individual battery. A battery module generally refers to a group of batteries or cells within the same enclosure that may be electrically connected to each other in series or parallel. Multiple modules can be combined into a battery unit or system. However, these terms are used differently by different companies or people. The functionality described in the current disclosure can be incorporated into a variety of battery, module, system and/or unit embodiments, regardless of the specific terminology employed by a given company, individual or manufacturer.

Failed cells and/or modules can be disconnected from the coolant system and/or the electrical power system of the vehicle or other device comprising the cells/modules. Valves can be closed to keep coolant from certain modules, for example. And circuits can be used to electrically isolate any failed cell or module from a broader system. Top plates and bottom plates with their inlets and outlets can be connected serially, in parallel or in combinations of the foregoing. Valves with electrical or wireless connections can be used to turn off fluid coupling between the battery modules. The above functions can either be performed using a circuit that is external to the battery system or passively using the circuit that is triggered by the thermal deformation of the deformation element.

Figure 18:
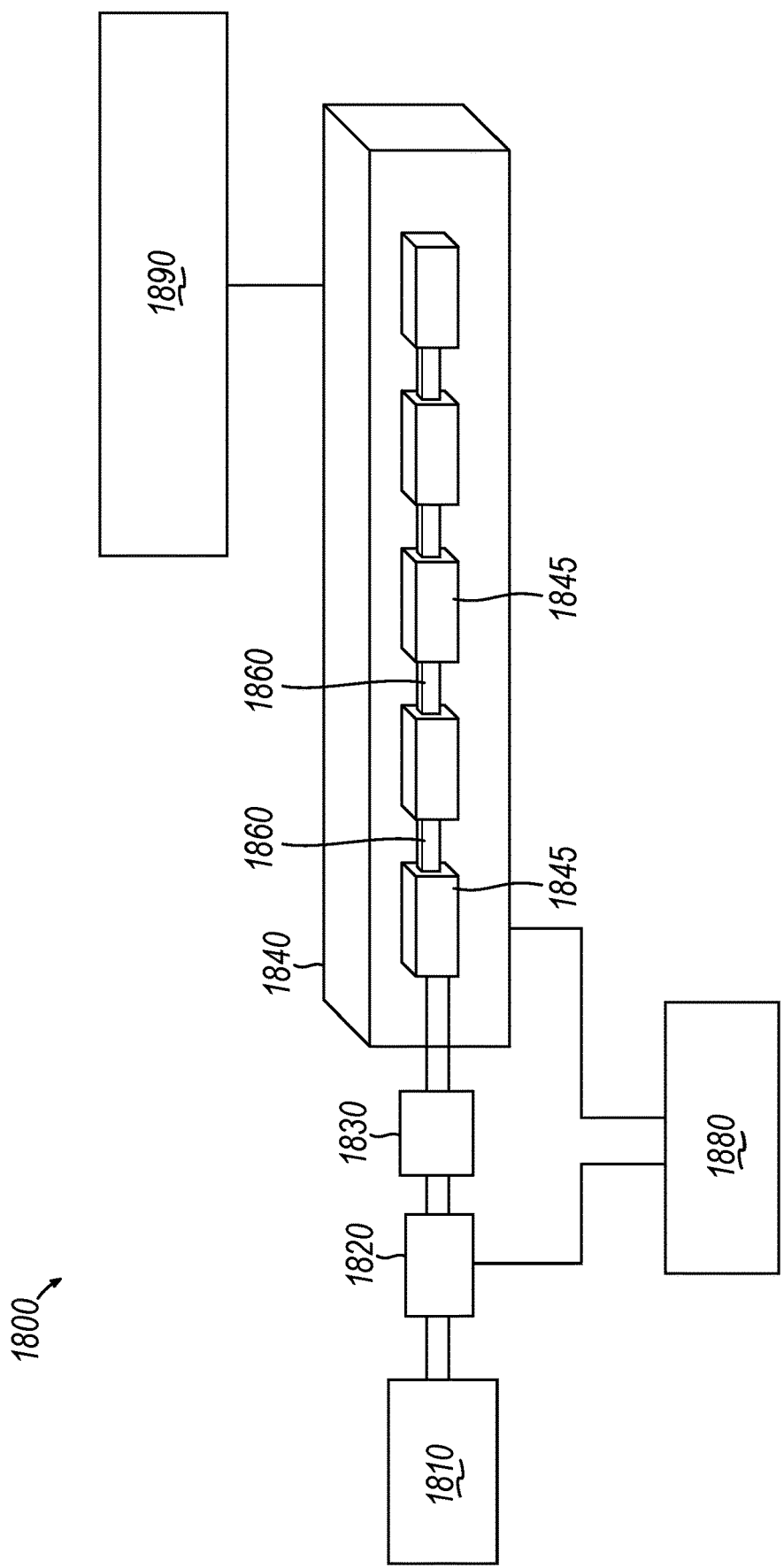
FIG. 18 shows a battery system embodiment under the present disclosure.

FIG. 18 shows a possible battery system embodiment under the present disclosure. Battery system 1800 can comprise a standalone system or be integrated into a vehicle, car, building, aircraft, or other larger system. Coolant supply 1810 can house a supply of water, water/glycol solution or other coolant. Pump 1820 can pump coolant from supply 1810 to battery unit 1840. Battery unit 1840 can comprise one or more battery modules 1845, such as in the embodiments described above. The battery modules 1845 can supply power to consuming components 1890, such as to drive a vehicle. Connection lines 1860 can couple the battery modules 1845 together and to the pump 1820 and other components. Chiller/heater 1830 is optional and can provide heating of coolant for use in cold weather or chilling of coolant for use in hot weather. System 1800 can comprise a variety of fluid connection lines 1860 including bypass lines to be used when a certain battery module 1845 experiences failure and should be fluidly isolated. Valves, gates or other components can also be used to direct the flow of coolant. Controller 1780 can control system 1700, with or without continuous human input. Controller 1880 can comprise connections to pump 1820, battery unit 1840, and/or other components. Controller 1880 can comprise a memory, storage, a processor, a user interface and/or other components. Controller 1880 can comprise a portion of consuming components 1890. Other embodiments may omit a controller 1880 and can simply rely on the reaction of deformation elements to overheating batteries. Controller 1880 can comprise machine-readable media with instructions so as to carry out the methods described herein and the related functionality described herein. Controller 1880 can in some embodiments be remotely located and may communicate with system 1880 via wireless or wired communication means.

Figure 19:
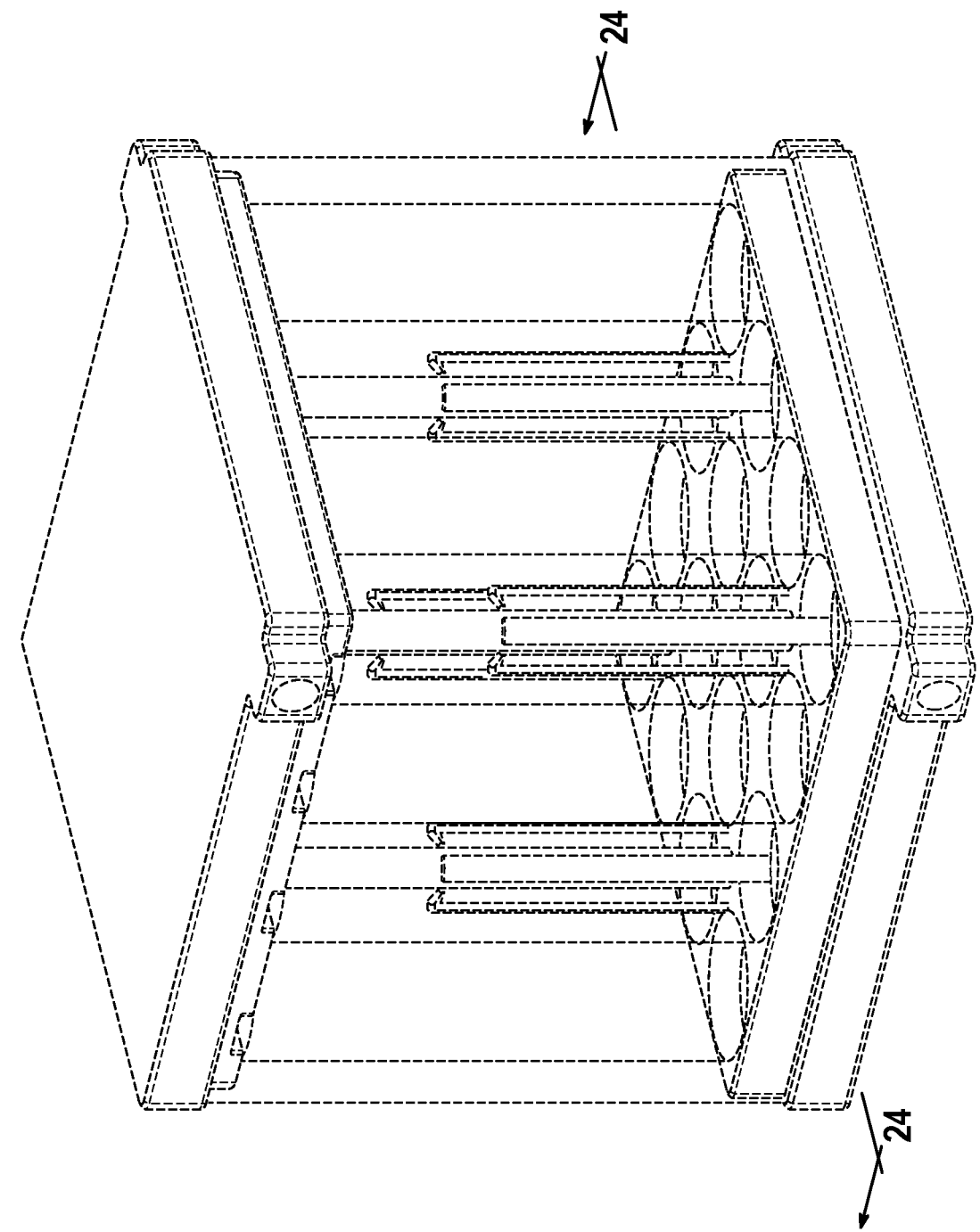
FIG. 19 shows a perspective view of a potential design of a battery module embodiment under the present disclosure.
Figure 20:
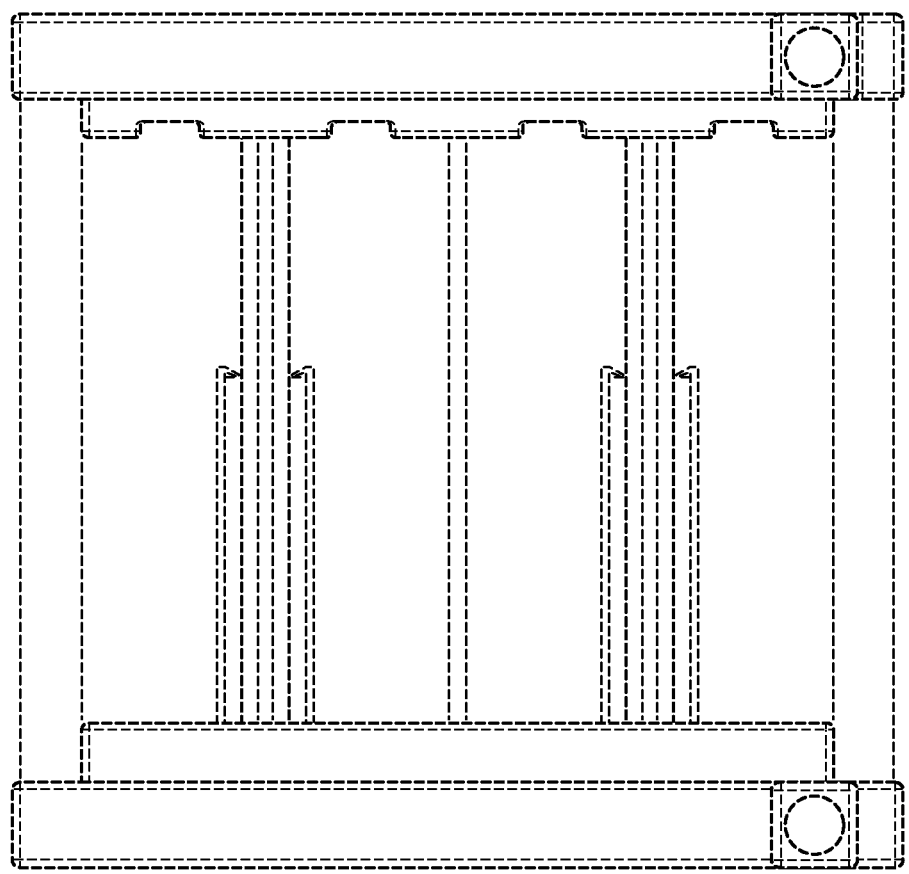
FIG. 20 shows a side view of a potential design of a battery module embodiment under the present disclosure.
Figure 21:
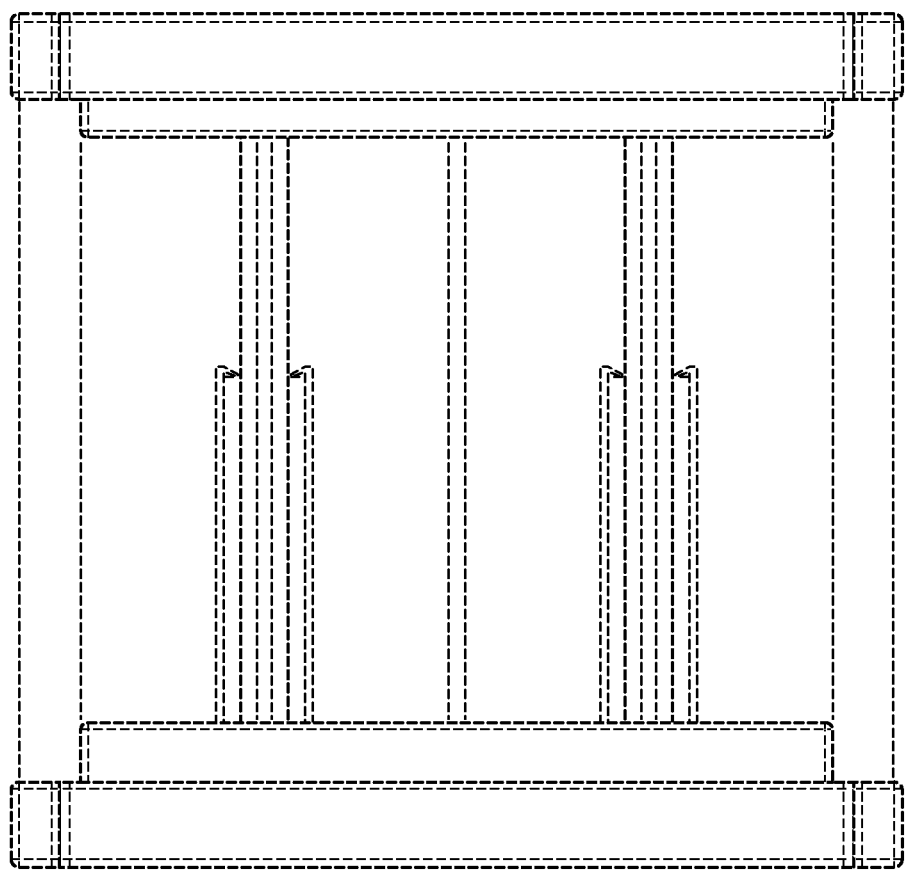
FIG. 21 shows a front view of a potential design of a battery module embodiment under the present disclosure.
Figure 22:
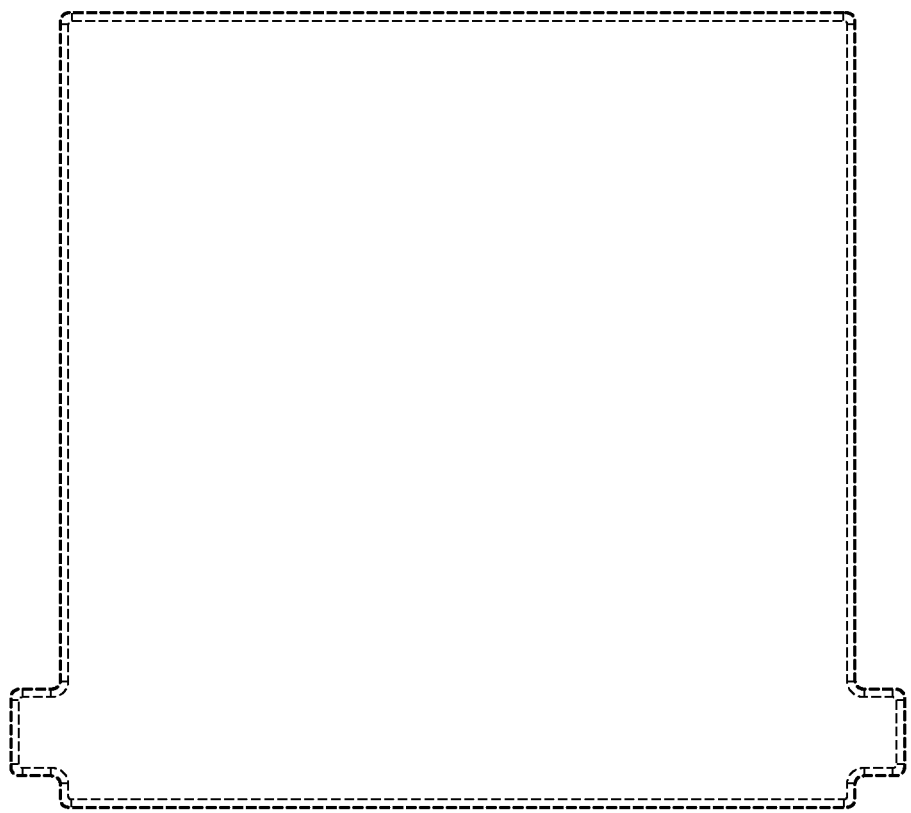
FIG. 22 shows a top view of a potential design of a battery module embodiment under the present disclosure.
Figure 23:
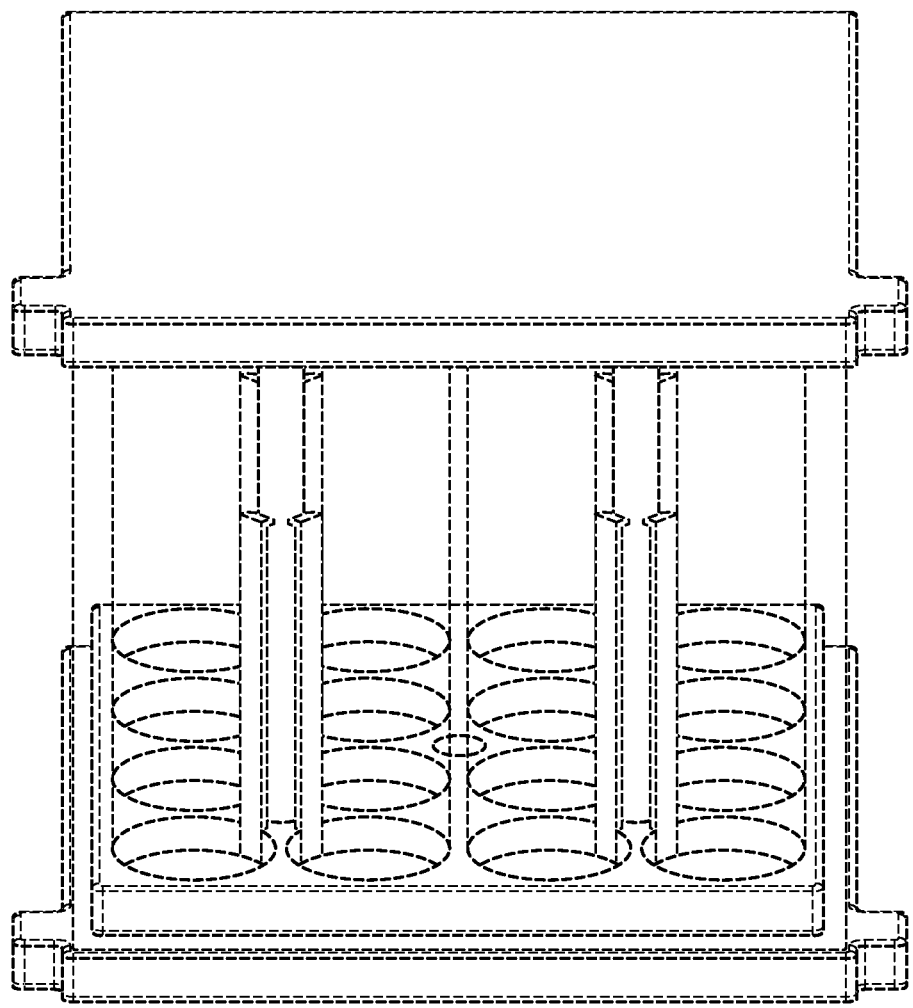
FIG. 23 shows a perspective view of a potential design of a battery module embodiment under the present disclosure.
Figure 24:
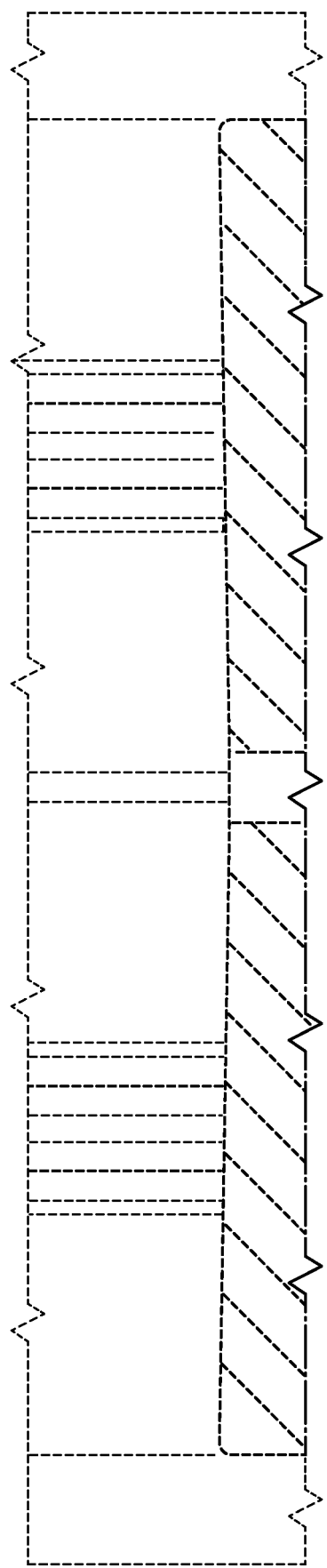
FIG. 24 shows a cut-away view of a potential design of a battery module embodiment under the present disclosure.

FIGS. 19-24 shows possible design views of potential battery module embodiments under the present disclosure. FIG. 19 shows a perspective view from a side-top angle. FIG. 20 shows a side view. FIG. 21 shows a front view. FIG. 22 shows a top view. FIG. 23 shows a perspective front-top view. FIG. 24 shows a cut-away view of a bottom portion of a battery module.

Computer Systems of the Present Disclosure

It will be appreciated that computer systems are increasingly taking a wide variety of forms. In this description and in the claims, the terms "controller," "computer system," or "computing system" are defined broadly as including any device or system—or combination thereof—that includes at least one physical and tangible processor circuit and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations.

The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Abbreviated List of Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal," "adjacent," and the like are used herein solely to indicate relative directions and are not otherwise intended to limit the scope of the disclosure and/or claimed invention.

Conclusion

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention itemed. Thus, it should be understood that although the present invention has been specifically disclosed in part by preferred embodiments, exemplary embodiments, and optional features, modification and variation of the concepts herein disclosed may be resorted to by those skilled in the art, and such modifications and variations are considered to be within the scope of this invention as defined by the appended items. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments without departing from the spirit and scope of the invention as defined by the items and are to be considered within the scope of this disclosure.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques specifically described herein are intended to be encompassed by this invention.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. All changes which come within the meaning and range of equivalency of the items are to be embraced within their scope.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A battery module comprising: one or more batteries configured to provide power to one or more energy consuming components; and a coolant conduit configured to receive coolant at an inlet and direct the coolant to an outlet, the coolant conduit comprising; a top conduit configured to direct the coolant along a top surface of the one or more batteries; a bottom conduit configured to direct the coolant along a bottom surface of the one or more batteries; one or more conduits extending between the top conduit and bottom conduit, the one or more conduits configured to direct the coolant from the top conduit and/or the bottom conduit along a lateral surface of the one or more batteries; and a deformation element coupled to at least one of the one or more batteries along the lateral surface and configured to deform if the at least one battery reaches an unsafe temperature, wherein the deformation element is configured to deform so as to release the coolant from one of the one or more conduits to direct the coolant onto the at least one battery and wherein the deformation element comprises one or more points or edges with which to puncture the one or more conduits so as to release the coolant.

2. The battery module of claim 1, wherein as the unsafe temperature increases, more of the one or more points or edges will puncture the one or more conduits.

3. The battery module of claim 1, wherein the deformation element comprises a spiral shape wound around the at least one battery.

4. The battery module of claim 1 further comprising: a solid enclosure configured to surround at least a portion of the battery module and to collect and confine the coolant fluid discharged on to the batteries; and a gutter or ductwork configured to drain discharged coolant away from the battery module.

5. The battery module of claim 1, wherein at least one of the one or more conduits comprises a serpentine path along the side surface of a plurality of the one or more batteries.

6. The battery module of claim 5, wherein each of the plurality of the one or more batteries comprises a deformation element, and wherein any of the deformation elements may puncture the at least one conduit along the serpentine path.

7. A battery module comprising:
one or more batteries configured to provide power;
a top conduit configured to direct coolant along a top surface of the one or more batteries;
a bottom conduit configured to direct coolant along a bottom surface of the one or more batteries;
one or more coolant conduits configured to pass between the one or more batteries and to carry coolant; and
one or more deformation elements coupled to the one or more batteries and configured to deform when the one or more batteries reaches an undesired temperature, wherein the one or more deformation elements comprises one or more points configured to puncture the one or more coolant conduits upon deformation so as to direct coolant onto the one or more batteries experiencing the undesired temperature.

8. The battery module of claim 7 wherein the one or more coolant conduits comprises a serpentine path among the one or more batteries.

9. The battery module of claim 7, wherein as the undesired temperature increases, more of the one or more points or edges will puncture the one or more coolant conduits.

10. The battery module of claim 7 wherein the one or more coolant conduits and coolant are configured to provide indirect contact heat transfer during normal operation of the one or more batteries.

11. A battery module comprising:
two or more rows of one or more batteries, wherein the two or more rows are stacked vertically, the two or more rows comprising at least a bottom row and a top row;
one or more coolant conduits comprising;
 one or more horizontal conduits located above and/or below the two or more rows; and
 one or more vertical conduits located in one or more gaps between the one or more batteries; and
one or more deformation elements, each of the one or more deformation elements coupled to one of the one or more batteries and configured to deform if a failing battery amongst the one or more batteries reaches an unsafe temperature, wherein each of the one or more deformation elements comprises a point or an edge configured to puncture the one or more vertical conduits when the one or more deformation elements deforms.

12. The battery module of claim 11 further comprising a connection to a temperature controlling unit configured to chill or heat the coolant to provide a suitable operating environment over all anticipated temperatures during normal operation of the battery.

13. The battery module of claim 11 wherein each of the two or more rows comprises a support structure to hold the one or more batteries in place.

14. The battery module of claim 11 wherein the one or more battery modules further comprise one or more electrical circuits configured to electrically isolate the respective of the one or more batteries if the deformation element deforms sufficiently in response to excessive cell heating or if coolant is detected outside the coolant conduits.

15. The battery module of claim 11 further comprising one or more supports, each of the one or more supports configured to hold one of the one or more batteries in place and to couple the one or more deformation elements to the one or more batteries.

* * * * *